(12) United States Patent
Gaddam et al.

(10) Patent No.: US 12,223,360 B2
(45) Date of Patent: Feb. 11, 2025

(54) TESTING FRAMEWORK WITH LOAD FORECASTING

(71) Applicant: Dell Products L.P., Round Rock, TX (US)

(72) Inventors: Sambasivarao Gaddam, South Grafton, MA (US); Shivangi Geetanjali, Patna (IN); Sowmya Kumar, Bangalore (IN); Sweta Kumari, Bangalore (IN); Shivangi Maharana, Cuttack (IN); Sashibhusan Panda, Bengaluru (IN); Shishir Kumar Parhi, Bangalore (IN); Harikrishna Reyyi, Patha Agraharam (IN); Baishali Roy, Bangalore (IN); Seshadri Srinivasan, Shrewsbury, MA (US); Antarlina Tripathy, Bangalore (IN); Hung Dinh, Austin, TX (US); Bijan Kumar Mohanty, Austin, TX (US); Krishna Mohan Akkinapalli, Leander, TX (US); Satish Ranjan Das, Round Rock, TX (US); Shashikiran Rajagopal, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 876 days.

(21) Appl. No.: 17/346,815

(22) Filed: Jun. 14, 2021

(65) Prior Publication Data
US 2022/0398133 A1 Dec. 15, 2022

(51) Int. Cl.
*G06F 9/50* (2006.01)
*G06F 8/65* (2018.01)
(Continued)

(52) U.S. Cl.
CPC ............... *G06F 9/505* (2013.01); *G06F 8/65* (2013.01); *G06F 9/466* (2013.01); *G06F 9/541* (2013.01); *G06N 20/00* (2019.01)

(58) Field of Classification Search
CPC ...................................... G06F 9/505
See application file for complete search history.

(56) References Cited

U.S. PATENT DOCUMENTS 9,525,606 B1 * 12/2016 Staggs et al. ........... H04L 43/06
10,554,738 B1 * 2/2020 Ren ..................... H04L 67/1008
(Continued)

OTHER PUBLICATIONS

Red Hat, "Integration: Rest vs. Soap," https://www.redhat.com/en/topics/integration/whats-the-difference-between-soap-rest#:~:text=Representational, Accessed Mar. 20, 2021, 6 pages.
(Continued)

*Primary Examiner* — James J Debrow
(74) *Attorney, Agent, or Firm* — Ryan, Mason & Lewis, LLP

(57) ABSTRACT

A method comprises collecting data corresponding to a plurality of components in a system, wherein the data comprises information about at least one of respective protocols and respective interfaces associated with respective ones of the plurality of components. The data is analyzed to determine at least one of the respective protocols and the respective interfaces associated with the respective ones of the plurality of components. In the method, operations of one or more components of the plurality of components are tested based at least in part on the determination of the at least one of the respective protocols and the respective interfaces. The method further includes outputting respective statuses of the one or more components, wherein the respective statuses are derived at least in part from the testing.

20 Claims, 24 Drawing Sheets

(51) Int. Cl.
  *G06F 9/46* (2006.01)
  *G06F 9/54* (2006.01)
  *G06N 20/00* (2019.01)

(56) References Cited

U.S. PATENT DOCUMENTS

| 11,277,369 | B1 * | 3/2022 | Motamedi et al. | ..... H04L 51/26 |
| 11,908,573 | B1 * | 2/2024 | Forehand et al. | ..... G16H 40/20 |
| 2021/0126837 | A1 | 4/2021 | Dinh et al. | |

OTHER PUBLICATIONS

Techopedia, "Integration Middleware," https://www.techopedia.com/definition/28054/integration-middleware#:~:text=Integration, Accessed May 28, 2021, 11 pages.
Wikipedia, "Git," https://en.wikipedia.org/w/index.php?title=Git&oldid=1024155263, May 20, 2021, 22 pages.
Sumo Logic, "Pivotal Cloud Foundry (PCF)" https://www.sumologic.com/glossary/pcf/, Accessed May 20, 2021, 14 pages.
Spring, "Poller," https://docs.spring.io/spring-integration/reference/html/polling-consumer.html, May 18, 2021, 8 pages.
Github, "Forecasting at Scale," https://facebook.github.io/prophet/, Accessed May 28, 2021, 4 pages.

* cited by examiner

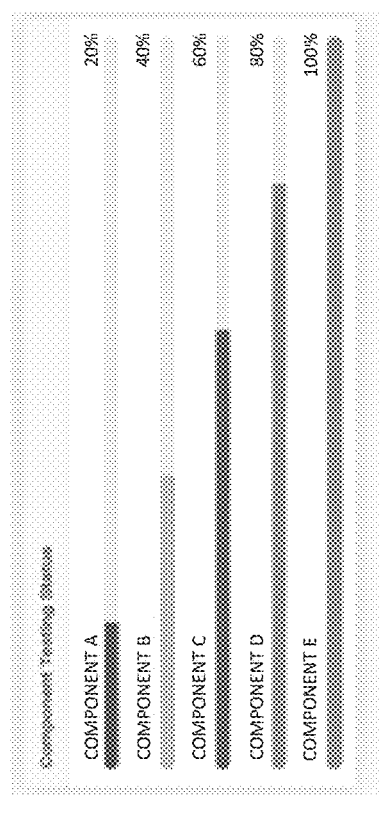
FIG. 5B
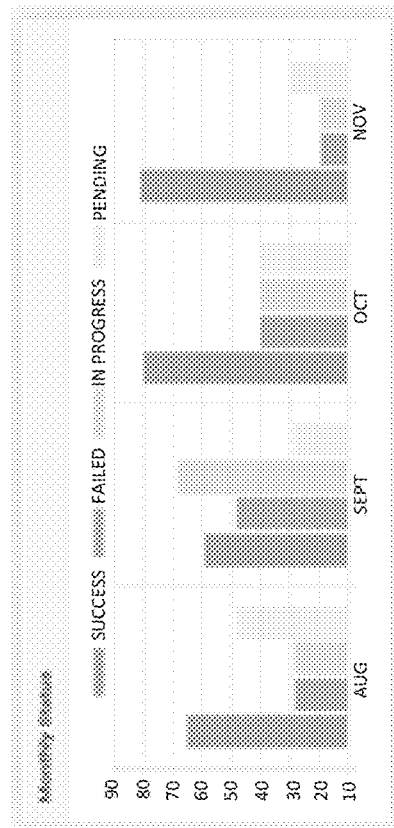
FIG. 5A
FIG. 5C

```
MQPCF mqPcf = new MQPCF();
if (Arrays.asList(args).indexOf("-c")>=0)
mqPcf.connectToTheQueueManager(qMgr, host, chl, port);    //Connect to MQ Remotely
else
mqPcf.connectToTheQueueManager(qMgr);                      //Connect to MQ Locally if(showQs)  mqPcf.showQueueStatus(showSystemQueues, showAsCsv);   //Get ALL Queue Status
if(showChs) mqPcf.showChlStatus(showAsCsv);                        //Get ALL Channel Status
if(showQms) mqPcf.showQmgrStatus(showAsCsv);                       //Get ALL Queue Manager Status mqPcf.disconnectFromTheQueueManager();                     //Disconnect From Queue Manager
```

FIG. 16

```
public interface DellMQAPIinterface { public void connect() throws MQException;
    public void openQueue(boolean forBrowse) throws MQException;
    public Object getMessage(boolean browse, int waitInterval) throws MQException, Exception;
    public void deleteMessage(byte[] messageId) throws MQException, Exception;
    public void closeQueue() throws MQException;
    public void disconnect() throws MQException;
    public boolean isConnectionOpen() throws Exception;
}
```

FIG. 17

```
# Prophet requires columns ds (date) and y (value)
transactions = transactions.rename(columns={'date': 'ds', 'Transactions': 'y'})

# Put market cap in billions
transactions['y'] = transactions['y'] / 1e9
# Make the prophet model and fit on the data
gp_prophet = fbprophet.Prophet(changepoint_prior_scale=0.15)
gp_prophet.fit(transactions)

INFO:fbprophet:Disabling yearly seasonality. Run prophet with yearly_seasonality=True to override this.
INFO:fbprophet:Disabling weekly seasonality. Run prophet with weekly_seasonality=True to override this.
INFO:fbprophet:Disabling daily seasonality. Run prophet with daily_seasonality=True to override this.
INFO:fbprophet:n_changepoints greater than number of observations. Using 8.

<fbprophet.forecaster.Prophet at 0x22ba41ac5320>

# Make a future dataframe for 2 years
gp_forecast = gp_prophet.make_future_dataframe(periods=365 * 2, freq='d')
# Make predictions
gp_forecast = gp_prophet.predict(gp_forecast)
```

FIG. 20

TESTING FRAMEWORK WITH LOAD FORECASTING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to a framework for testing ecosystem components.

BACKGROUND

A Data Platform Services (DPS) ecosystem may include hundreds of integrations having different designs and running different protocols. For example, a middleware platform may comprise hundreds of interfaces covering multiple designs, architectures and protocols. Ecosystems often need to upgrade their components with new features to, for example, improve performance and security. Following an upgrade, testing must be performed to ensure proper operation of the ecosystem components. Current techniques for testing ecosystem components are inefficient and time-consuming. Accordingly, there is a need for appropriate systems and techniques for testing the ecosystem components.

SUMMARY

Embodiments provide a component testing framework in an information processing system.

For example, in one embodiment, a method comprises collecting data corresponding to a plurality of components in a system, wherein the data comprises information about at least one of respective protocols and respective interfaces associated with respective ones of the plurality of components. The data is analyzed to determine at least one of the respective protocols and the respective interfaces associated with the respective ones of the plurality of components. In the method, operations of one or more components of the plurality of components are tested based at least in part on the determination of the at least one of the respective protocols and the respective interfaces. The method further includes outputting respective statuses of the one or more components, wherein the respective statuses are derived at least in part from the testing.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 5A depicts a portion of a user interface displaying monthly testing statuses in an illustrative embodiment.

FIG. 5B depicts a portion of a user interface displaying component testing statuses in an illustrative embodiment.

FIG. 5C depicts a portion of a user interface displaying a log of component updates in an illustrative embodiment.

FIG. 16 depicts example pseudocode for gathering message queue, manager and channel status information in an illustrative embodiment.

FIG. 17 depicts example pseudocode for operation of a message queuing application programming interface (API) in an illustrative embodiment.

FIG. 20 depicts example pseudocode for predicting transaction load over a given time period in an illustrative embodiment.

DETAILED DESCRIPTION

Figure 1:
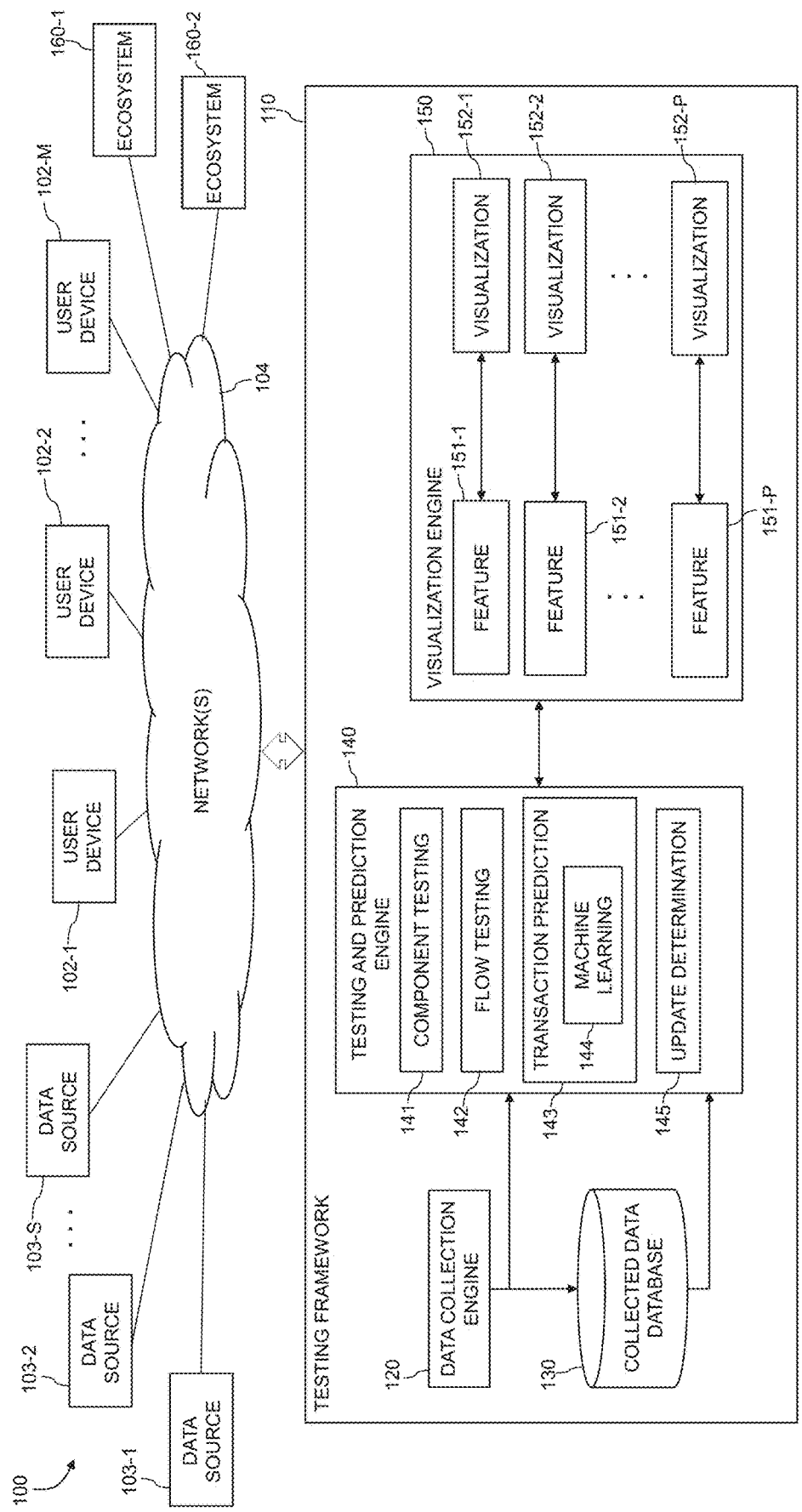
FIG. 1 depicts an information processing system with a testing framework in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" or "interface" refers to a set of subroutine definitions, protocols, and/or tools for building software. Generally, an API defines communication between software components. APIs permit programmers to write software applications consistent with an operating environment or website.

As used herein, the term "middleware" is to be broadly construed to refer to software that links different applications. Some examples of middleware are products that establish connections between web servers and database systems and connections between message producers and consumers. As used herein, the term "integration" or "integrations" is to be broadly construed to refer to middleware that is classified based on domains. Some examples of integrations are cloud integration, business-to-business (B2B) integration, application integration (A2A) and data integration products. Cloud integration products integrate with and between cloud services, cloud-based applications, private clouds, trade hubs. Cloud integration products may use, for example, web services and B2B communication strategies. B2B integration products integrate customer, provider and partner interfaces with various data resources and enterprise managed applications. A2A products integrate enterprise managed cloud-based and/or remote system applications with each other. Data integration products integrate enterprise data resources, such as, for example, databases and files, over enterprise and operational intelligence systems. Some non-limiting examples of middleware comprise MOM or message queue (MQ) products, autonomous integration cloud (AIC) products, service-oriented architecture (SOA) products and B2B products.

FIG. 1 shows an information processing system 100 configured in accordance with an illustrative embodiment. The information processing system 100 comprises user devices 102-1, 102-2, ... 102-M (collectively "user devices 102"). The user devices 102 communicate over a network 104 with a testing framework 110.

The user devices 102 can comprise, for example, Internet of Things (IoT) devices, desktop, laptop or tablet computers, mobile telephones, or other types of processing devices capable of communicating with the testing framework 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable M and other similar index variables herein such as K, L and P are assumed to be arbitrary positive integers greater than or equal to two.

The terms "client" or "user" herein are intended to be broadly construed so as to encompass numerous arrangements of human, hardware, software or firmware entities, as well as combinations of such entities. Testing services may be provided for users utilizing one or more machine learning models, although it is to be appreciated that other types of infrastructure arrangements could be used. At least a portion of the available services and functionalities provided by the testing framework 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the testing framework 110, as well as to support communication between the testing framework 110 and connected devices (e.g., user devices 102) and/or other related systems and devices not explicitly shown.

In some embodiments, the user devices 102 are assumed to be associated with repair technicians, system administrators, information technology (IT) managers, software developers, release management personnel or other authorized personnel configured to access and utilize the testing framework 110.

The information processing system 100 further includes ecosystem 160-1 and ecosystem 160-2 (collectively "ecosystems 160") connected to the user devices 102 and to the testing framework 110 via the network 104. The ecosystems 160 comprise, for example, servers, VMs, middleware and applications, which are connected over one or more networks like network 104 and/or through direct wired connections. The testing framework 110 tests ecosystem components deployed in heterogenous servers. The components run a variety of designs, architectures and protocols, such as, for example, Point-to-Point (P2P), webservice, batch, request/reply, publisher/subscriber, extensible markup language (XML), JavaScript Object Notation (JSON), representational state transfer (REST), simple object access protocol (SOAP) and messaging integration patterns (MIP), and input data flows through different interfaces via, for example, file transfer protocol (FTP) servers and different MOM platforms. As part of the results of the testing, the testing framework 110 generates visualizations depicting one or more statuses of the components of one or more of the ecosystems 160 for users such as, for example, ecosystem administrators, so that the users can efficiently view the real-time statuses of components of one or more of the ecosystems 160. Although two ecosystems 160-1 and 160-2 are shown, the embodiments are not necessarily limited thereto, and more or less ecosystems 160 may be part of the information processing system 100.

Figure 2:
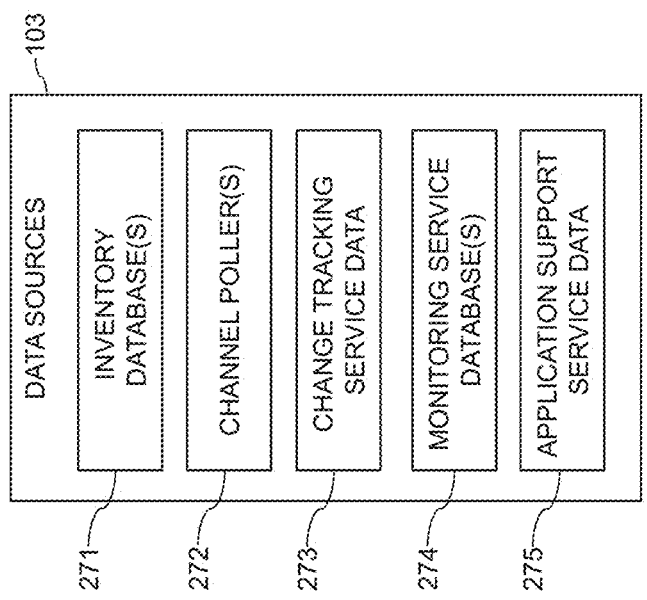
FIG. 2 depicts data sources from which the testing framework collects data in an illustrative embodiment.

The information processing system 100 further includes data sources 103-1, 103-2, . . . 103-S (collectively "data sources 103") which supply data to the testing framework 110 via the network 104. Referring to FIG. 2, the data sources 103 include, but are not necessarily limited to, inventory database(s) 271 (e.g., inventoried data and metadata associated with one or more components of the ecosystems 160), channel poller(s) 272, change tracking service data 273 (e.g., Git properties and Git pipeline data), monitoring service databases(s) 274 (e.g., Actmon databases) and application support service data 275 (e.g., cloud service, for example, Pivotal Cloud Foundry (PCF) information). In one or more embodiments, the data may be in the form of notifications and/or alerts sent to users (e.g., via user devices 102) in response to one or more issues (e.g., failures, anticipated failures) with applications, middleware, servers, VMs or other components of an ecosystem. For example, notifications and/or alerts may be generated from applications, cloud deployment services (e.g., PCF), cloud based website and application performance tracking services, workflow orchestration services and middleware sources, including, for example, MOM providers. Some non-limiting examples of MOM providers are IBM® MQ (International Business Machines Corporation, Armonk, NY), RabbitMQ® (Pivotal Software, Inc., San Francisco, CA), Apache™ ActiveMQ® and Apache™ Kafka® (Apache Software Foundation, Wakefield, MA). The MOM providers include architectures with, for example, APIs and administrative tools to route and deliver messages. In an embodiment, the MOM providers respectively run on different operating systems and/or platforms or different implementations of the same operating system and/or platforms. For example, the MOM providers are of different types, and require different functionality or implementations of connectivity/messaging protocols, such as, for example, machine-to-machine (M2M) messaging protocols. In a non-limiting embodiment, M2M protocols can include, but are not necessarily limited to, Message Queuing Telemetry Transport (MQTT), constrained application protocol (CoAP), and/or OMA lightweight machine to machine (LWM2M).

The data from the data sources comprises, for example, parameters and details about the respective protocols, the respective interfaces and/or the respective integrations associated with and used for executing respective ones of the components an ecosystem 160. For example, the respective protocols comprise a webservice protocol, a batch protocol, a request/reply protocol, an XML protocol, a JSON protocol, a REST protocol and a SOAP.

Additionally, the respective protocols comprise one or more MOM MIPs. Referring to FIGS. 10-15, the MOM MIPs comprise for example, a P2P without routing MOM MIP 1000, a P2P without routing and with load balancing MOM MIP 1100, a many-to-one P2P without routing MOM MIP 1200, a P2P with routing MOM MIP 1300, a fan-out MOM MIP 1400 and a publisher/subscriber MOM MIP 1500. The MIPs 1000-1500 indicate network connections (N/W) between elements having different IP addresses.

Figure 10:
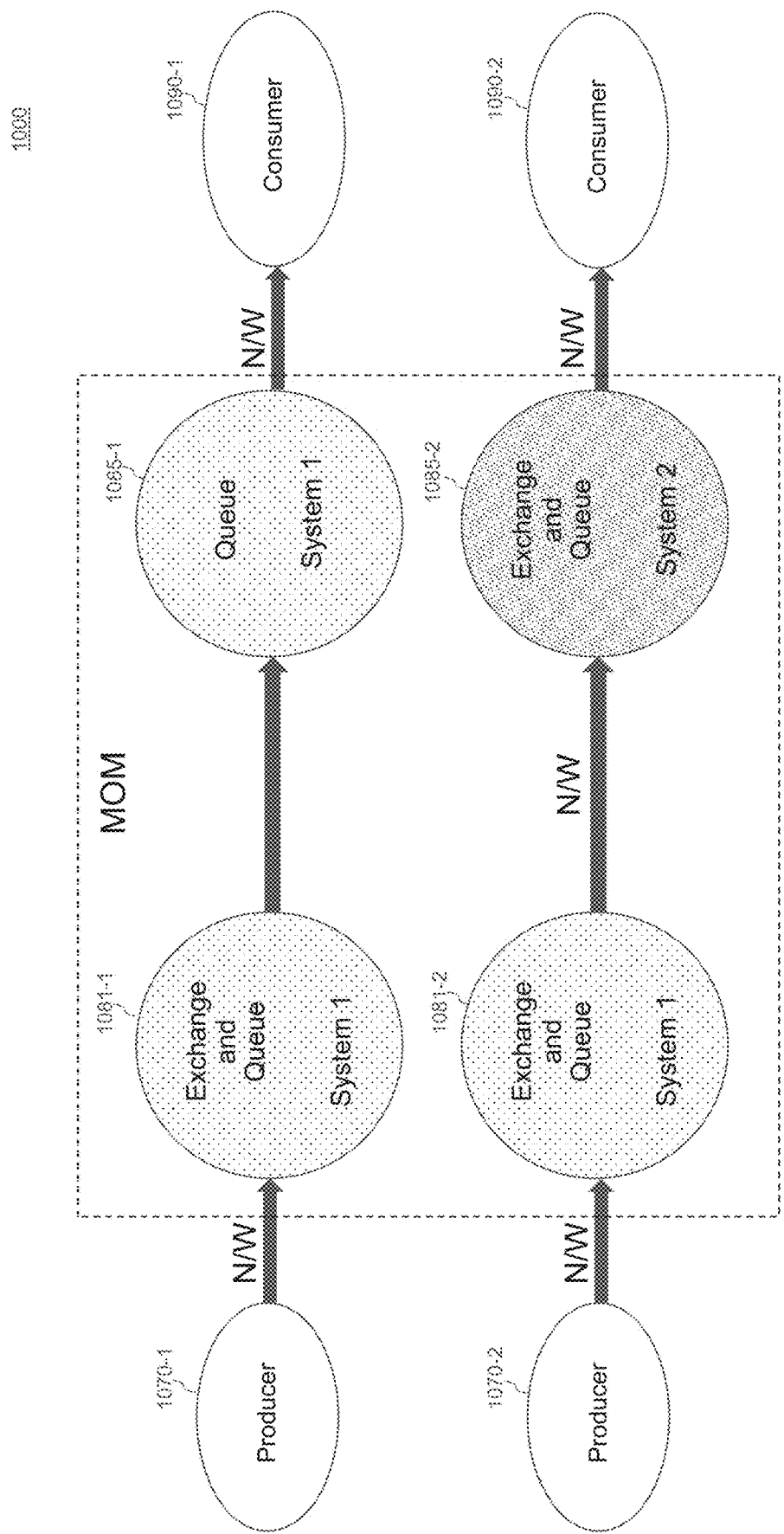
FIG. 10 is a block diagram of a point-to-point (P2P) without routing message-oriented-middleware (MOM) messaging integration pattern (MIP) in an illustrative embodiment.

The MIP 1000 in FIG. 10 is an example of a P2P without routing MOM MIP 1000. In FIG. 10, producers 1070-1 and 1070-2 are respectively connected to messaging exchanges and queues (exchange/queue 1081-1 and exchange/queue 1081-2), which transmit messages to messaging queue 1085-1 and messaging exchange/queue 1085-2, respectively, for consumption by consumers 1090-1 and 1090-2, respectively. The queue 1085-1 is connected to exchange/queue 1081-1 without a network since they are on the same server. FIG. 10 indicates that exchange/queue 1081-1, exchange/queue 1081-2 and queue 1085-1 correspond the same MOM platform (System 1). The exchange/queue 1085-2 is on a different server associated with a different MOM platform (System 2), and is connected to the exchange/queue 1081-2 via a network. In this and other instances described herein, an exchange and/or queue on a different server from other exchanges and/or queues may indicate that a consumer corresponding to the exchange and/or queue on the different server is using a different MOM provider than other consumers. For example, in the case of FIG. 10, consumer 1090-2 may be using a different MOM provider than consumer 1090-1. The producers 1070-1 and 1070-2 are respectively connected to exchange/queue 1081-1 and exchange/queue 1081-2 via one or more networks, and queue 1085-1 and exchange/queue 1085-2 are respectively connected to consumers 1090-1 and 1090-2 via one or more networks.

Figure 11:
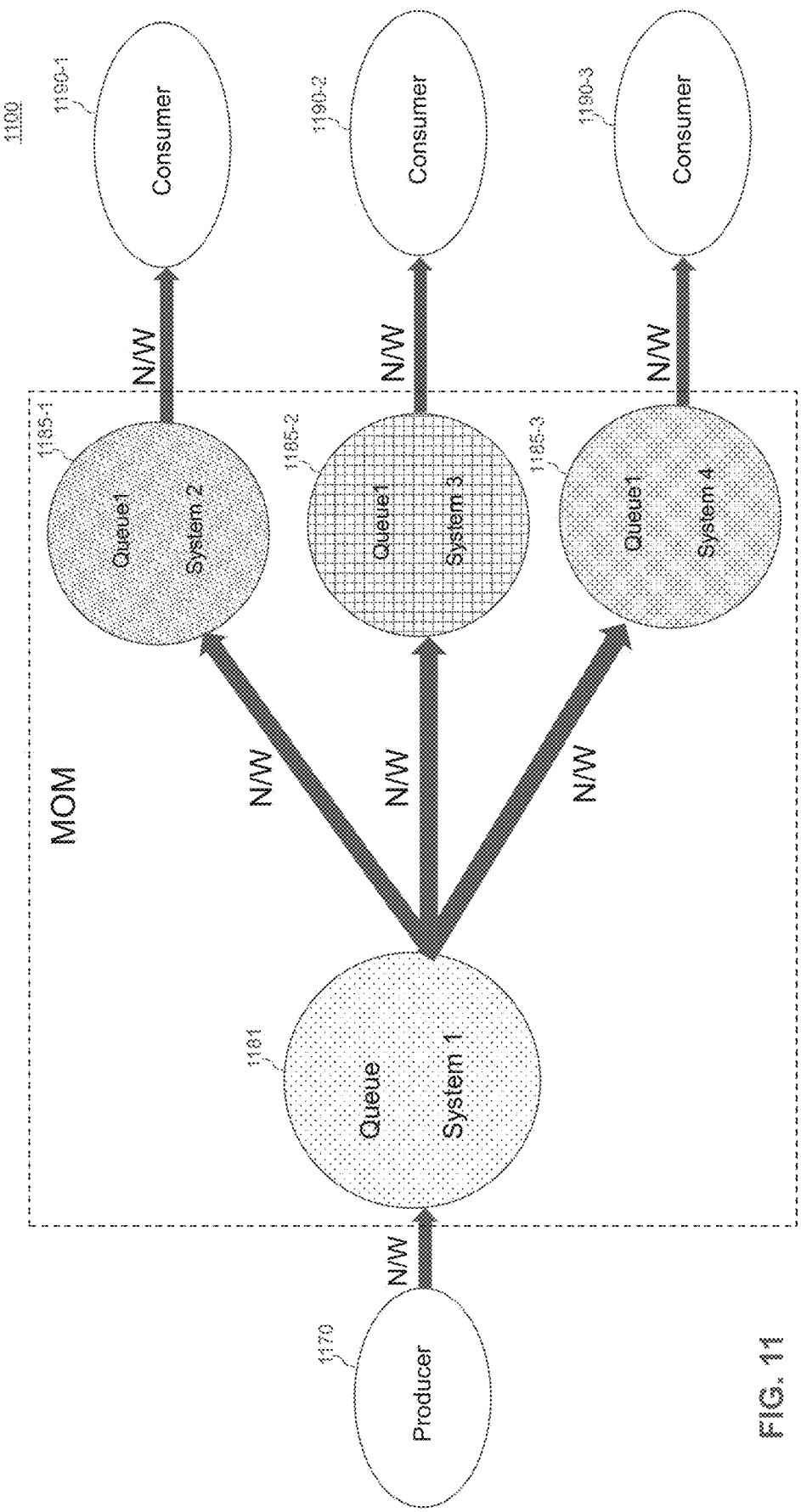
FIG. 11 is a block diagram of a P2P without routing and with load balancing MOM MIP in an illustrative embodiment.

The MIP 1100 in FIG. 11 is an example of a P2P with load balancing and without routing MOM MIP 1100. In FIG. 11, a producer 1170 is connected to a messaging queue 1181 of System 1, which transmits messages to messaging queues 1185-1, 1185-2 and 1185-3 of Systems 2, 3 and 4, respectively, for consumption by consumers 1190-1, 1190-2 and 1190-3. In the FIG. 11 embodiment, in a load balancing arrangement, the queue 1181 sends each message in the queue to the next queue (queue1, queue2 or queue3 1185-1, 1185-2 or 1185-3), in sequence. In this round-robin distribution, each consumer 1190-1, 1190-2 and 1190-3 receives approximately the same number of messages. For example, a first message will be transmitted to a first consumer 1190-1, a second message to a second consumer 1190-2, a third message to a third consumer 1190-3, a fourth message to the first consumer 1190-1 and so on.

Queue1, queue2 and queue 3 1185-1, 1185-2 and 1185-3 are each on different servers associated with different MOM platforms from each other (System 2, System 3 and System 4), and from queue 1181. Each of queue1, queue2 and queue 3 1185-1, 1185-2 and 1185-3 are connected to queue 1181 via a network. The producer 1170 is connected to queue 1181 via a network, and the queues 1185-1, 1185-2 and 1185-3 are connected to consumers 1190-1, 1190-2 and 1190-3 via one or more networks.

Figure 12:
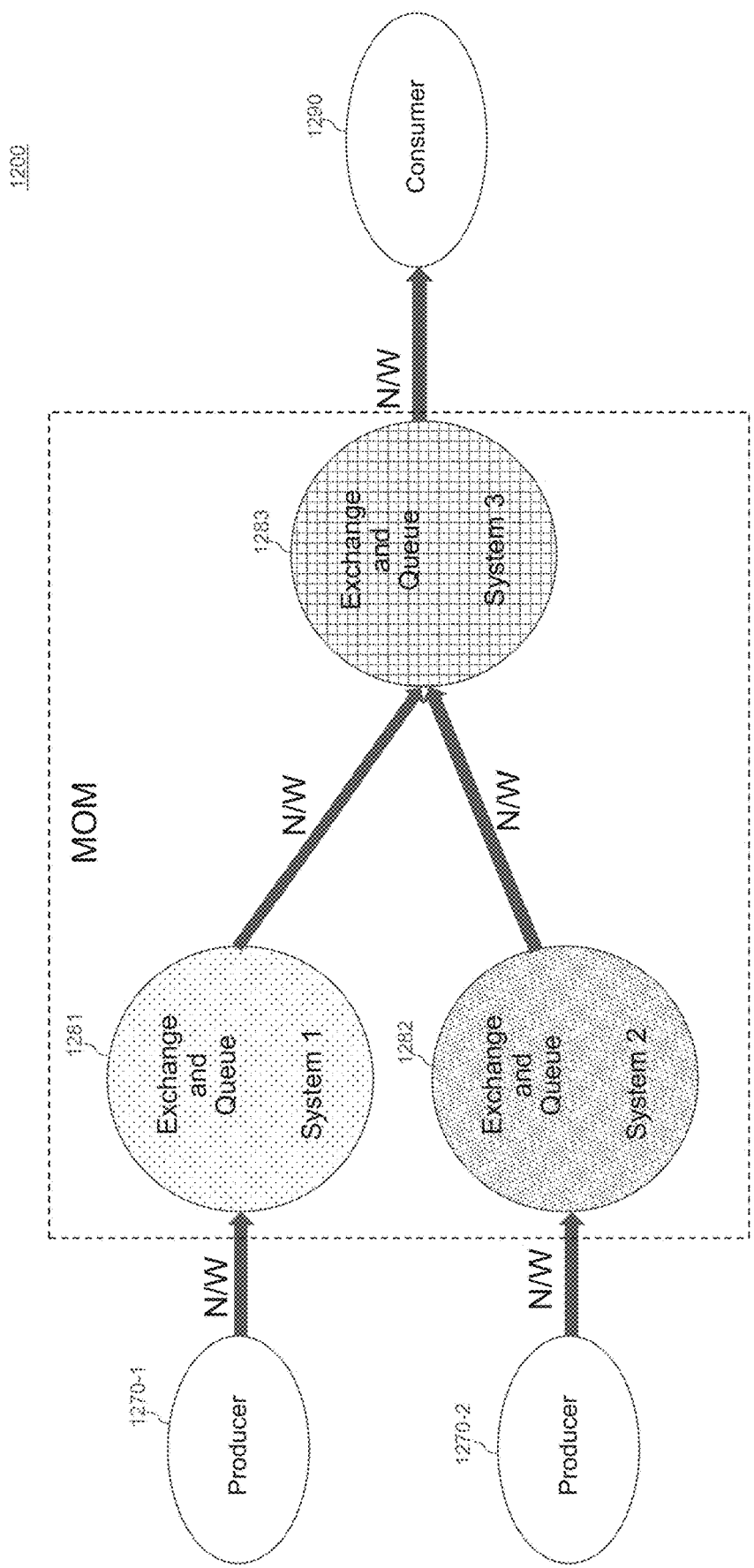
FIG. 12 is a block diagram a many-to-one P2P without routing MOM MIP in an illustrative embodiment.

The MIP 1200 in FIG. 12 is an example of a many-to-one P2P without routing MOM MIP 1200. In FIG. 12, producers 1270-1 and 1270-2 are respectively connected to messaging exchanges and queues (exchange/queue 1281 and exchange/queue 1282) of System 1 and System 2, respectively, which transmit messages to messaging exchange and queue (exchange/queue) 1283 of System 3 for consumption by a consumer 1290. The exchange/queues 1281, 1282 and 1283 are each on different servers from each other associated with different MOM platforms, so that exchange/queues 1281 and 1282 are each connected to exchange/queue 1283 via a network. The producers 1270-1 and 1270-2 are respectively connected to exchange/queue 1281 and exchange/queue 1282 via one or more networks, and exchange/queue 1283 is connected to consumer 1290 via a network. In the many-to-one P2P without routing MOM MIP 1200, there are multiple producers (e.g., 1270-1 and 1270-2) using different MOM systems (e.g., System 1 and System 2) that publish to one consumer (e.g., 1290) using another MOM system (e.g., System 3).

Figure 13:
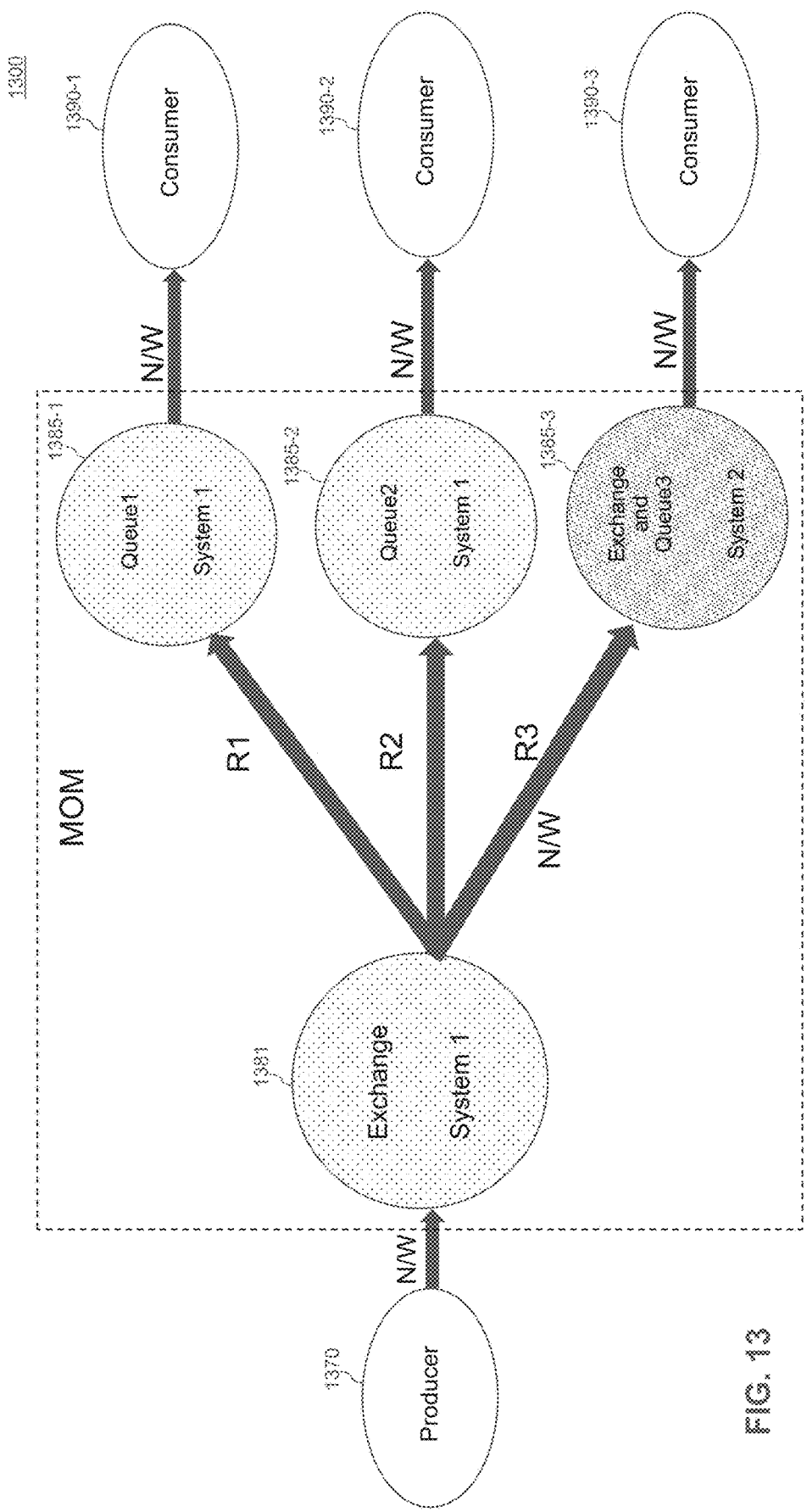
FIG. 13 is a block diagram of a P2P with routing MOM MIP in an illustrative embodiment.

The MIP 1300 in FIG. 13 is an example of a P2P with routing MIP 1300. In FIG. 13, a producer 1370 is connected to an exchange 1381, which routes messages to queues 1385-1 and 1385-2 and to an exchange and queue (exchange/queue) 1385-3 for consumption by consumers 1390-1, 1390-2 and 1390-3. The queues 1385-1 and 1385-2 are connected to exchange 1381 without a network since they are on the same server. FIG. 13 indicates that exchange 1381 and queues 1385-1 and 1385-2 correspond the same MOM platform (System 1). The exchange/queue 1385-3 is on a different server associated with a different MOM platform (System 2), and is connected to the exchange 1381 via a network. The producer 1370 is connected to exchange 1381 via a network, and the queues 1385-1 and 1385-2 and exchange/queue 1385-3 are connected to consumers 1390-1, 1390-2 and 1390-3 via one or more networks.

Figure 14:
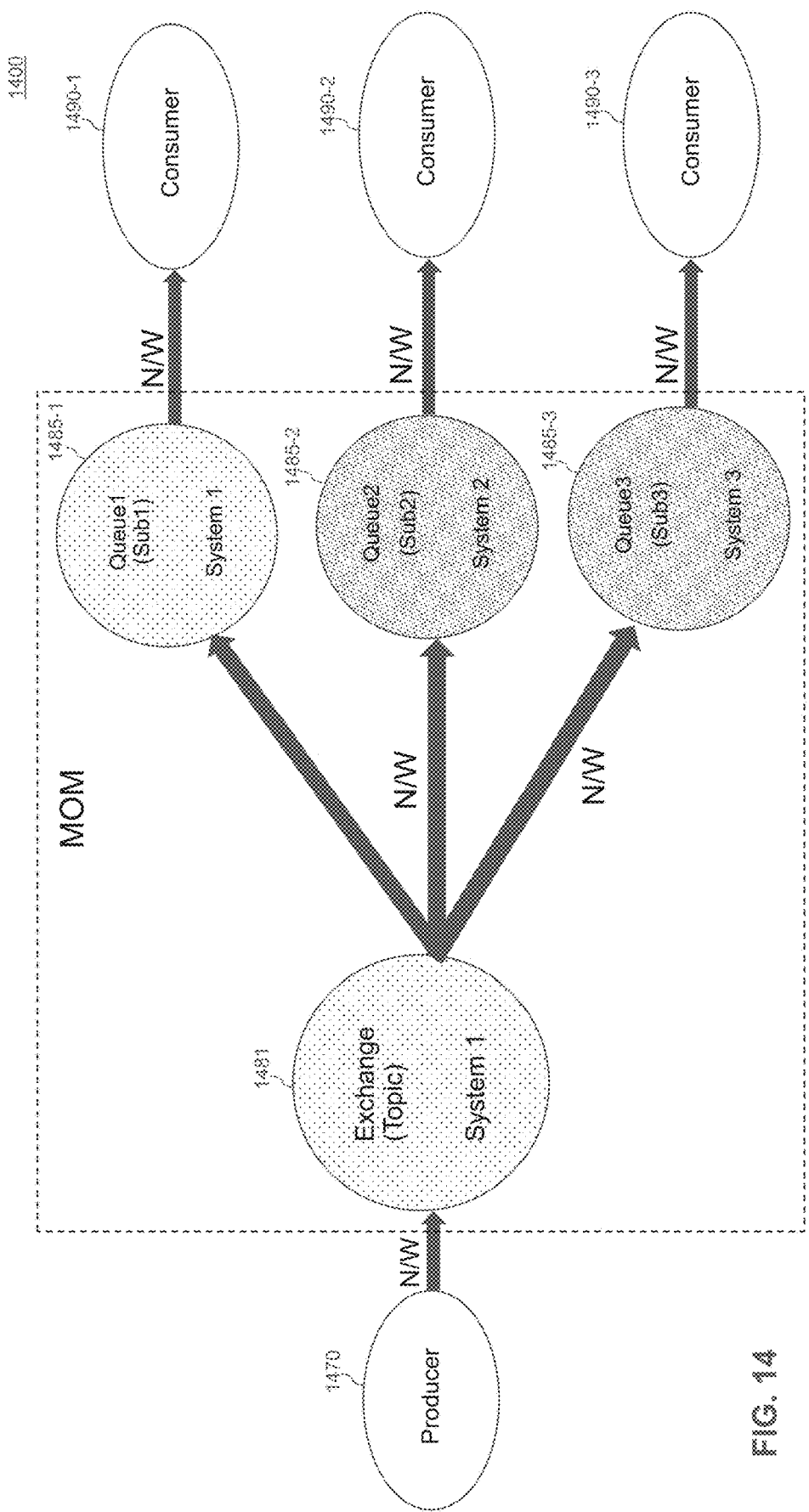
FIG. 14 is a block diagram of a fan-out MOM MIP in an illustrative embodiment.

The MIP 1400 in FIG. 14 is an example of a fan-out MOM MIP 1400. In FIG. 14, a producer 1470 is connected to an exchange 1481, which sends copies of the same messages to message queues 1485-1, 1485-2 and 1485-3 for consumption by consumers 1490-1, 1490-2 and 1490-3. Queue1 1485-1 is connected to exchange 1481 without a network since they are on the same server. FIG. 14 indicates that exchange 1481 and queue1 1485-1 correspond the same MOM platform (System 1). Queue1 and queue2 1485-2 and 1485-3 are on different servers associated with different MOM platforms (System 2 and System 3), and are connected to the exchange 1481 via one or more networks. The producer 1470 is connected to exchange 1481 via one or more networks, and the queues 1485-1, 1485-2 and 1485-3 are connected to consumers 1490-1, 1490-2 and 1490-3 via one or more networks. In FIG. 14, like a broadcast, each message is routed to each of the messaging queues 1485-1, 1485-2 and/or 1485-3 regardless of the topic or subscriptions Sub1, Sub2 and Sub3 of consumers 1490-1, 1490-2 and 1490-3. A fan-out methodology ignores routing keys, copies a message and routes the message to all queues regardless of consumer subscription.

Figure 15:
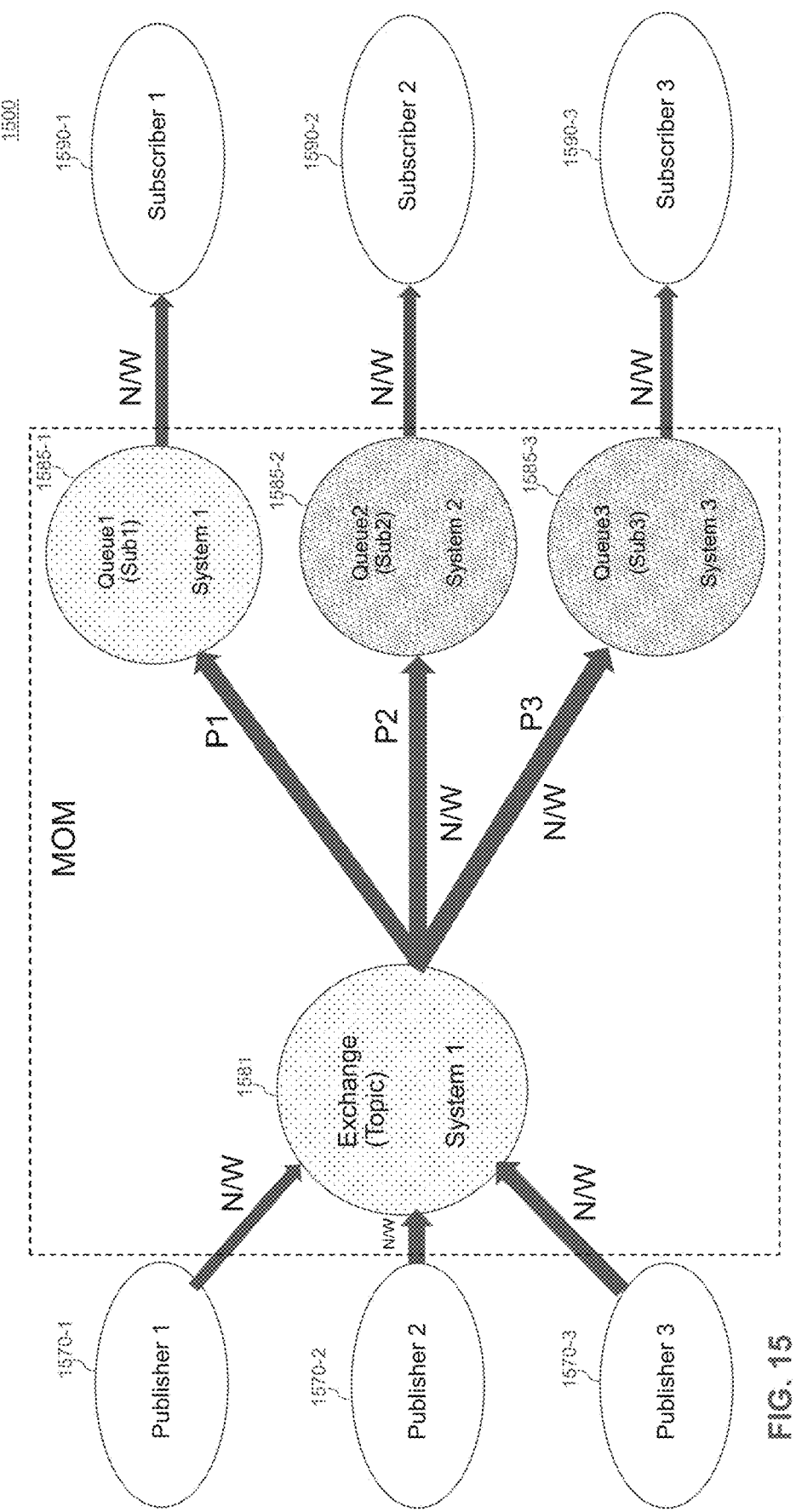
FIG. 15 is a block diagram of a publisher/subscriber MOM MIP in an illustrative embodiment.

The MIP 1500 in FIG. 15 is an example of a publisher/subscriber MOM MIP 1500. In FIG. 15, publishers 1570-1, 1570-2 and 1570-3 are connected to an exchange 1581, which routes messages to messaging queues 1585-1, 1585-2 and 1585-3 for consumption by subscribers 1590-1, 1590-2 and 1590-3. Queue1 1585-1 is connected to exchange 1581 without a network since they are on the same server. FIG. 15 indicates that exchange 1581 and queue1 1585-1 correspond the same MOM platform (System 1). Queue2 and queue3 1585-2 and 1585-3 are on different servers associated with different MOM platforms (System 2 and System 3), and are connected to the exchange 1581 via one or more networks. The publishers 1570-1, 1570-2 and 1570-3 are connected to exchange 1581 via one or more networks, and the queues 1585-1, 1585-2 and 1585-3 are connected to subscribers 1590-1, 1590-2 and 1590-3 via one or more networks. The indicators P1, P2 and P3 in FIG. 15 illustrate a publisher/subscriber MIP 1500, where certain messages are routed to particular messaging queues 1585-1, 1585-2 and/or 1585-3 based on subscriptions (Sub1, Sub2 and Sub3) of subscribers 1590-1, 1590-2 and 1590-3. For example, in this case, the publishers 1570-1, 1570-2 and 1570-3 send messages to exchange 1581, which routes the messages to different queues 1585-1, 1585-2 and 1585-3 based on, for example, the topics of the messages and whether the subscribers 1590-1, 1590-2 and 1590-3 are subscribed to a particular topic.

The different servers, different MOM platforms and different message channels associated with the MIPs 1000-1500 use different protocols and interfaces. The data from the data sources 103 includes details about and parameters of the different protocols, interfaces and channels used by the different servers and different MOM platforms associated with the MIPs 1000-1500. As explained further herein, the protocol, interface and channel data is analyzed by the testing framework 110 and used in connection with determining appropriate testing methods to test the operation of the components of the MIPs 1000-1500.

The data from the data sources 103 further comprises logs and metadata detailing, for example, one or more issues with the components of an ecosystem. The logs and metadata include, for example, application, middleware, server and database logs and metadata. The data from the data sources further comprises parameters, such as, for example, scaling or autoscaling parameters, and may include HTTP response codes indicating the success or failure of an API request, where failure may be attributed to omission of required parameters and/or errors with servers.

The testing framework 110 in the present embodiment is assumed to be accessible to the user devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The testing framework 110, on behalf of respective infrastructure tenants each corresponding to one or more users associated with respective ones of the user devices 102 provides a testing platform that provides end-2-end (E2E) visibility including business lifecycle views, transaction views and metrics generation in connection with component testing. The embodiments test the E2E business flow, and test the individual components irrespective of their corresponding designs, architectures, integrations and protocols. In illustrative embodiments, running components in a test environment will be tested based on source and target interfaces. The embodiments further determine the interface configurations which may require updating without redeploying the framework codebase. In addition, in connection with load testing, the embodiments forecast load and transactions for respective components using machine learning time series techniques.

Referring to FIG. 1, the testing framework 110 includes a data collection engine 120, a database 130 for collected data, a testing and prediction engine 140 and a visualization engine 150. The testing and prediction engine 140 includes a component testing layer 141, a flow testing layer 142, a transaction prediction layer 143 comprising a machine learning layer 144 and an update determination layer 145. The visualization engine 150 includes a plurality of visualization layers 152-1, 152-2, . . . 152-P (collectively "visualization layers 152") for generating visualizations of a plurality of features 151-1, 151-2, . . . 151-P (collectively "features 151").

The data collection engine 120 provides collected data from the data sources 103 to the testing and prediction engine 140, which analyzes the collected data to determine the respective protocols, the respective interfaces (e.g., APIs) and/or respective integrations associated with the respective ones of the plurality of components in the ecosystems 160. The components may comprise, for example, applications, instances of middleware (e.g., MOM platforms) and/or servers. Based on the determination of the respective protocols, the respective interfaces and/or the respective integrations associated with the respective ones of the components, the testing and prediction engine 140 selects and performs testing operations suited to the determined configurations of the components. The component testing layer 141 provides testing for individual components regardless of their configurations and associated protocols, interfaces and/or integrations. The flow testing layer 142 provides E2E enterprise (e.g., business) flow testing. The flow testing layer 142 performs tests through multiple components from data production to consumption as the data flows through multiple components, and through different interfaces and integrations operating under different protocols.

Respective statuses of the components derived from the testing are output by the testing and prediction engine 140 and features 151 corresponding to the respective statuses are provided to users in visualizations generated by the visualization layers 152 of the visualization engine. For example, referring to an example embodiment of the visualization engine 150 in FIG. 3, a visualization 352-1 of component test data depicts, for example, successful transactions and/or failed transactions corresponding to one or more components (e.g., one or more applications). For example, in an overall dashboard view, FIG. 5A depicts a portion of a user interface 501 displaying monthly testing statuses for a variety of components, providing a breakdown of successful test results (e.g., successful transactions), failed test results (e.g., failed transactions), tests which are in progress and tests which have not started (e.g., pending). A visualization 352-1 of component test data may also show component testing progress. For example, FIG. 5B depicts a portion of a user interface 502 displaying component testing statuses as completion percentages, where testing for components A, B, C, D and E are respectively, 20%, 40%, 60%, 80% and 100% complete. As part of a user interface (e.g., GUI), a dashboard will show the metrics of monthly, yearly and daily testing. The dashboard further illustrates additional testing status information such as, for example, testing failure or success logs, with reasons for component failures.

Figure 7:
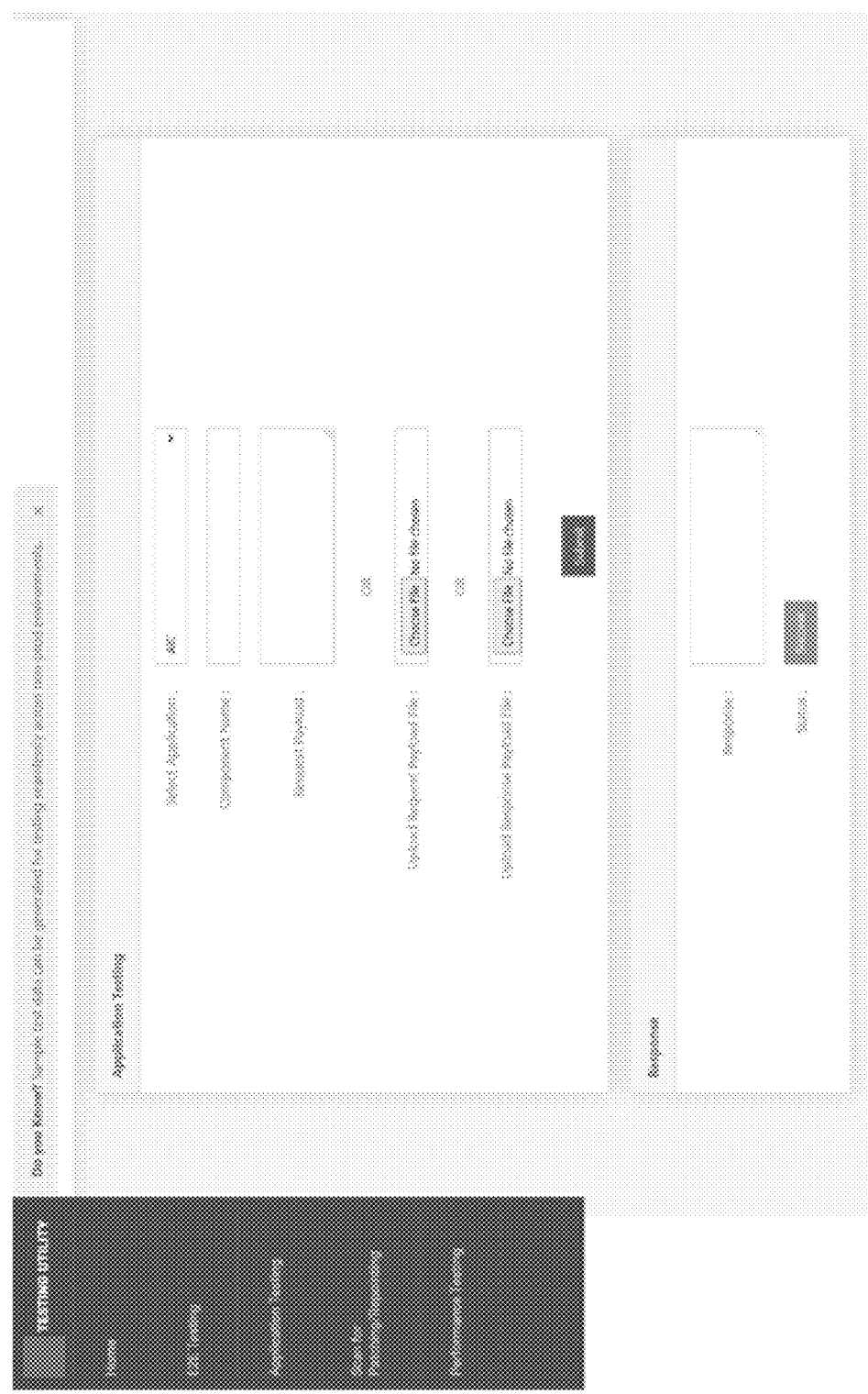
FIG. 7 illustrates a user interface for application testing in an illustrative embodiment.

As an additional example of a visualization 352-1 depicting component test data 351-1, FIG. 7 illustrates a user interface 700 (e.g., GUI) for application testing. More specifically, the user interface 700 permits testing selection by application name and component name. The user interface 700 also permits testing selection by a user provided request and response. The testing framework 110 will also trigger testing via uploaded request and/or response payload files. The user interface 700 may display an actual response with success or failed statuses. The component test data 351-1 may be the result of E2E testing or testing of individual transactions.

Figure 6:
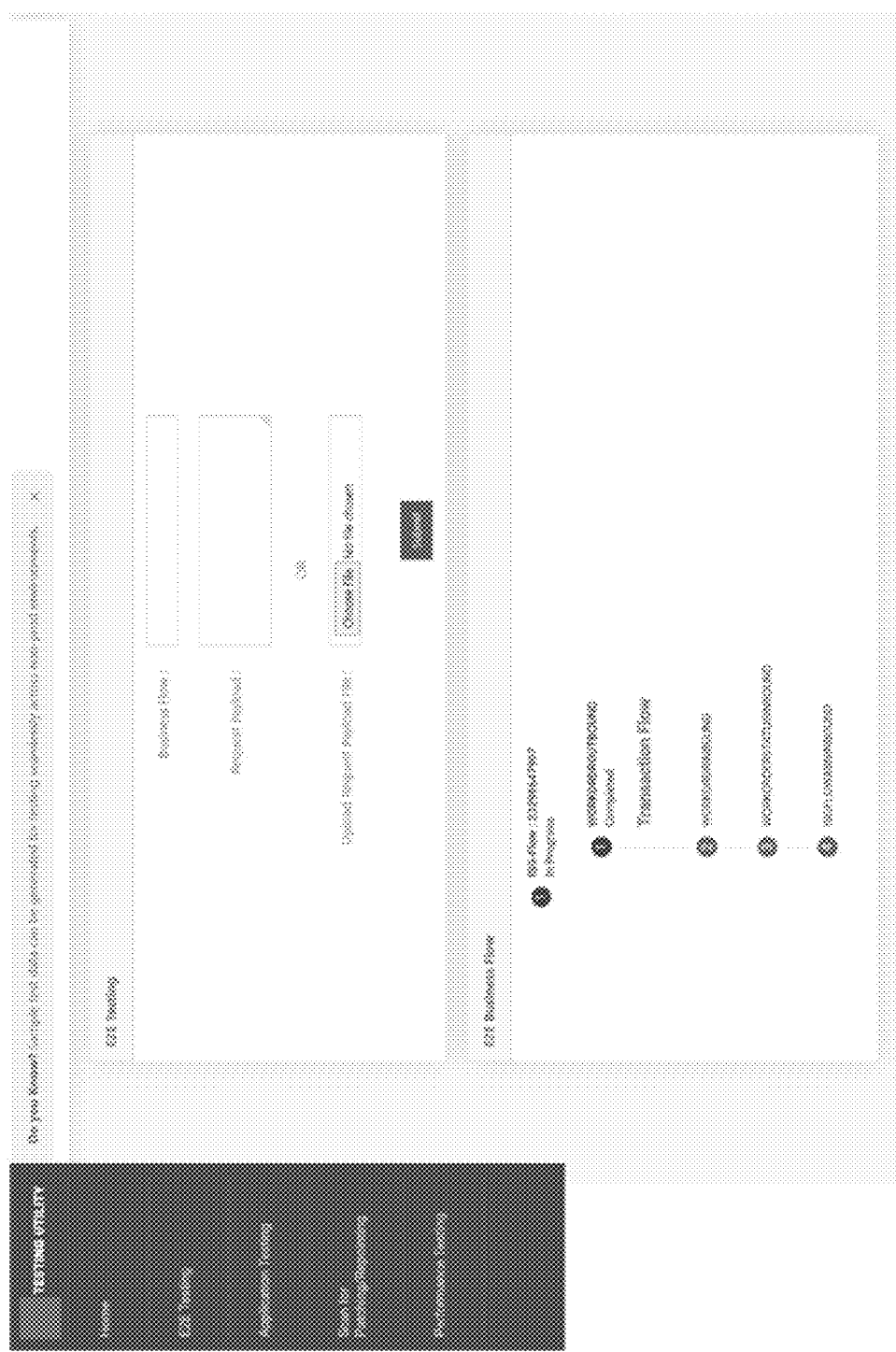
FIG. 6 depicts a user interface for end-to-end (E2E) testing in connection with a selected business flow in an illustrative embodiment.

A visualization 352-2 of E2E enterprise flow test data 351-2 depicts, for example, E2E test results in connection with a selected business flow. Referring, for example to the user interface 600 in FIG. 6, the user interface 600 (e.g., graphical user interface (GUI)) permits selection and visualization of E2E testing for a particular business flow. Testing can be triggered for a requested payload, where transaction flow can be seen at each stage with success or failure statuses along with logs. The business lifecycle view of the user interface 600 in FIG. 6 provides the testing statuses in terms of business flow. For example, in connection with the purchase of goods, when an order is booked, the order passes through many applications before being fulfilled and shipped from a factory. By using the E2E business lifecycle view, an order can be proactively tracked, and if there are any issues with the order due to, for example, failure of one or more components in an ecosystem, the issues can be addressed before a customer complains about a delay or other problem with the order. As can be seen in FIG. 6, the status of different steps for a given work order are shown. In this case, one of the tasks have been completed. Although the term "business" is used, the embodiments are not necessarily limited thereto, and similar user interfaces may be generated depicting process flows for operations in different types of commercial and non-commercial enterprises.

Referring back to FIG. 1, the update determination layer 145 identifies at least one component of a plurality of components of the ecosystems 160 requiring an update based at least in part on the respective statuses of the components derived from the testing. In one or more embodiments, the update determination layer 145 identifies a protocol and/or an interface corresponding to the at least one component requiring the update. The identification of a component requiring an update may be based on, for example, a determination by the update determination layer 145 that operation of the component requiring the update is impeded by a modification to an application programming interface.

Figure 3:
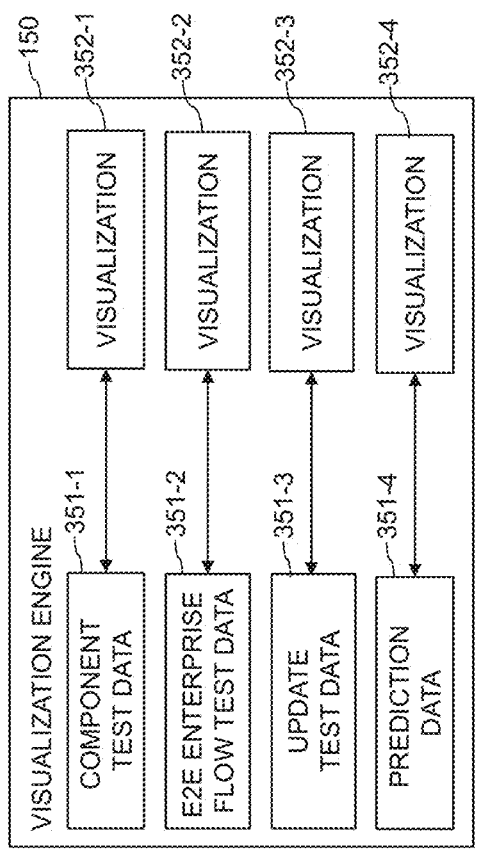
FIG. 3 depicts an example visualization engine of the testing framework in an illustrative embodiment.
Figure 8:
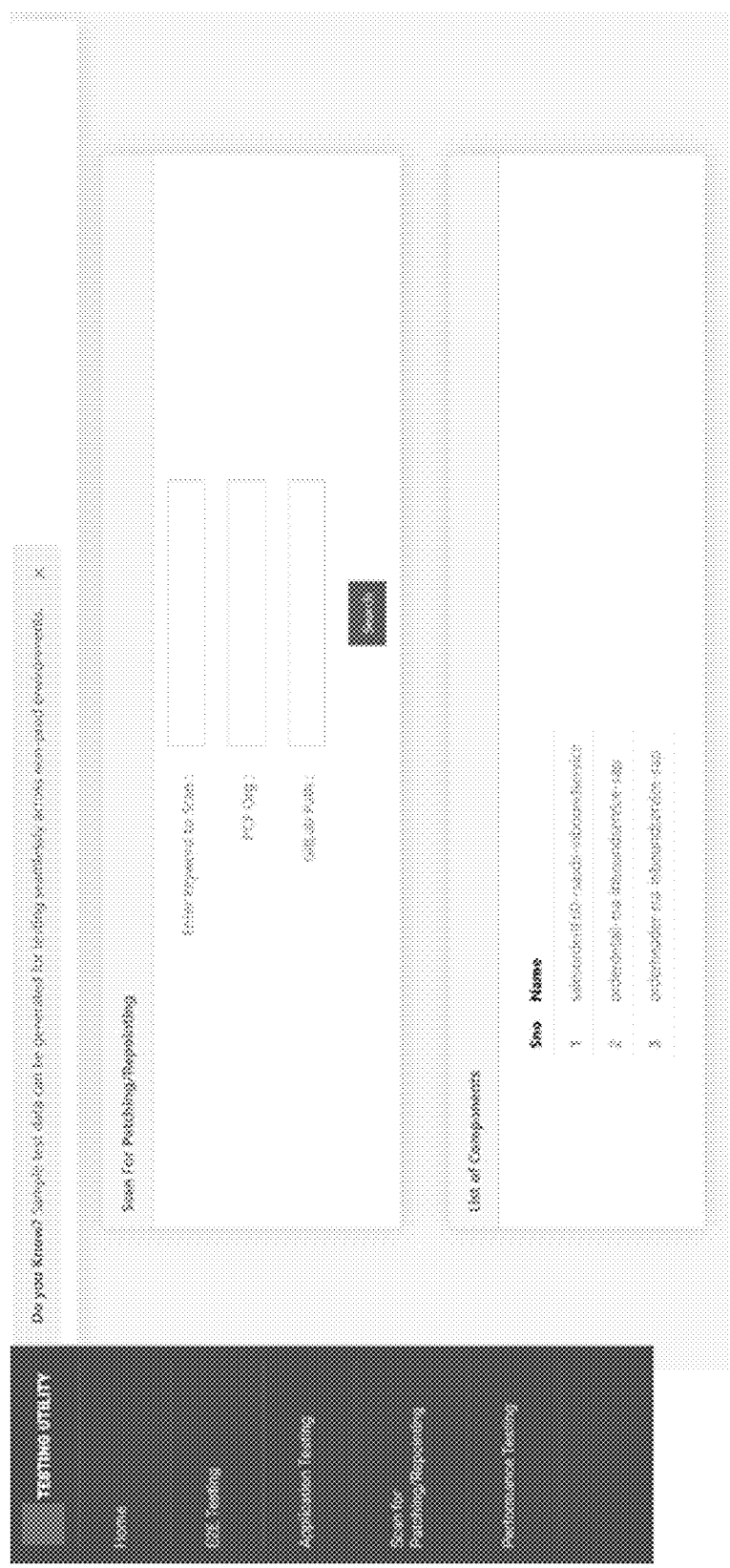
FIG. 8 illustrates a user interface for use in connection with identifying components that need to be updated in an illustrative embodiment.

Referring to FIG. 3, a visualization 352-3 of update test data 351-3 depicts, for example, a list of the components that need to be patched, re-pointed or updated in some way. For example, FIG. 8 illustrates a user interface 800 (e.g., GUI) for patching and/or re-pointing in connection with a testing utility. More specifically, the user interface 800 permits a user to enter a request for scanning application properties by, for example, keyword, PCF org and/or GitLab path, and provides a list of the components that correspond to the inputted parameters and need to be patched, re-pointed or updated in some way. In an overall dashboard view, FIG. 5C depicts a portion of a user interface 503 displaying a log of component updates.

The testing may comprise load testing of one or more of the components. Referring to FIG. 1, the transaction prediction layer 143 uses one or more machine learning techniques to predict a transaction load for the one or more components at one or more time periods. The transaction prediction layer 143 schedules the load testing at a time period based on the predicted transaction load. For example, the transaction prediction layer 143 schedules the load testing at a time period when the predicted transaction load for a given component is at a maximum or is relatively high when compared with other time periods or is at a desired value for load testing.

In illustrative embodiments, the machine learning layer 144 of the transaction prediction layer 143 analyzes a current series of transactions of a plurality of components and provides a forecast analysis of the maximum load occurrence for each of the components, which facilitates prediction of the time at which the maximum and minimum component load will occur. Based on the predicted time at which the maximum and minimum component load will occur, memory and instances are predicted as per the load requirement.

Time series data comprises a set of ordered data points with respect to time. The prediction is performed using time series analysis, which uses different machine learning algorithms to extract certain statistical information and characteristics of past time series data in order to predict future values. Some example algorithms which can be used for forecasting include, for example, an autoregressive-moving-average (ARMA) and an auto-regressive integrated moving average (ARIMA) model. According to an embodiment, the forecasting of the time series data is based at least in part on an additive model where non-linear trends are fit with different time periods at different levels of granularity (e.g., yearly, weekly, and daily seasonality) as well as with holiday effects (e.g., Prophet by Facebook®).

According to one or more embodiments, multistep-ahead prediction is used to predict a sequence of values in a time series. The predictive model is applied step by step and the predicted value of the current time step is used to determine its value in the next time step. The model is trained on time series data collected regularly over a given time period. The predicted result comprises a future transaction load of applications over a future time period, which will be used to procure necessary amounts of memory and space in advance to handle, for example, instances of high load at a given time.

In illustrative embodiments, the forecasting algorithm analyzes time series with monthly observations that display patterns on different time scales. For example, the model may predict transaction load on a per month basis. In predicting the transaction load, the number of future periods (e.g., 6 weeks, 6 months, 2 years, 5 years, etc.) to predict is specified and the frequency of predictions (e.g., hourly, daily, weekly, etc.) is also specified.

Figure 19A:
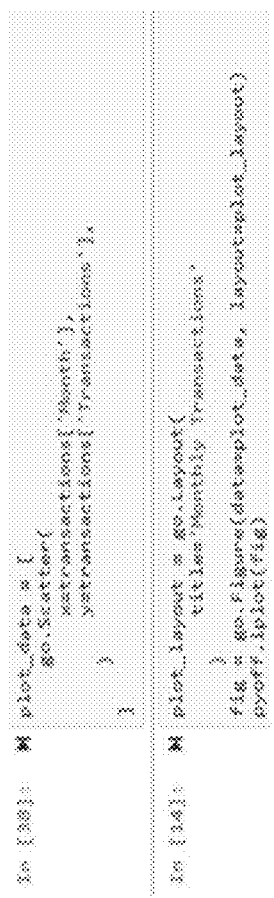
FIG. 19A depicts example pseudocode for plotting predicted monthly transaction load in an illustrative embodiment.
Figure 19B:
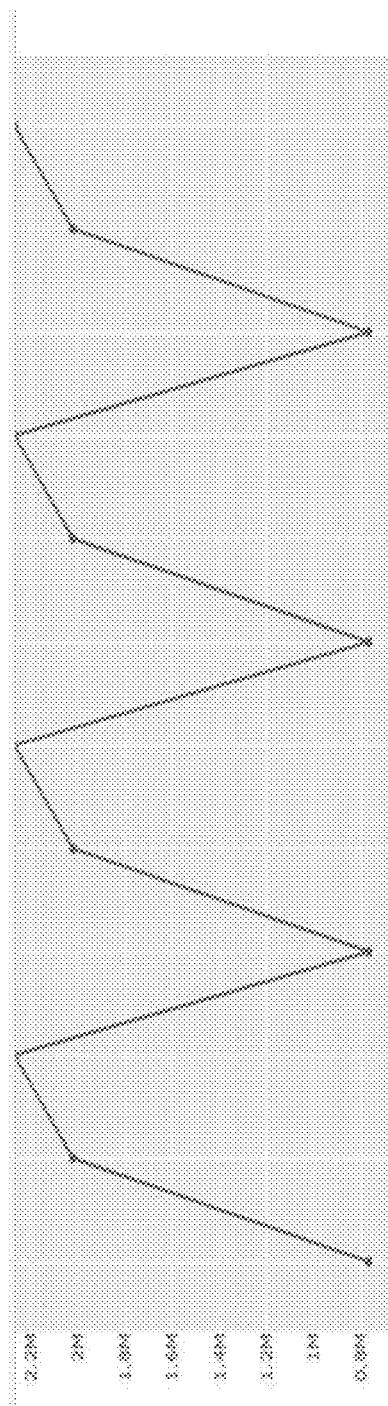
FIG. 19B depicts a plot of predicted monthly transaction load in an illustrative embodiment.

FIG. 19A depicts example pseudocode 1901 for plotting predicted monthly transaction load, and FIG. 19B depicts a plot 1902 of predicted monthly transaction load. Referring back to FIG. 3, the plot 1902 in FIG. 19B is an example of a visualization 352-4 of prediction data 351-4.

Figures 21A, 21B:
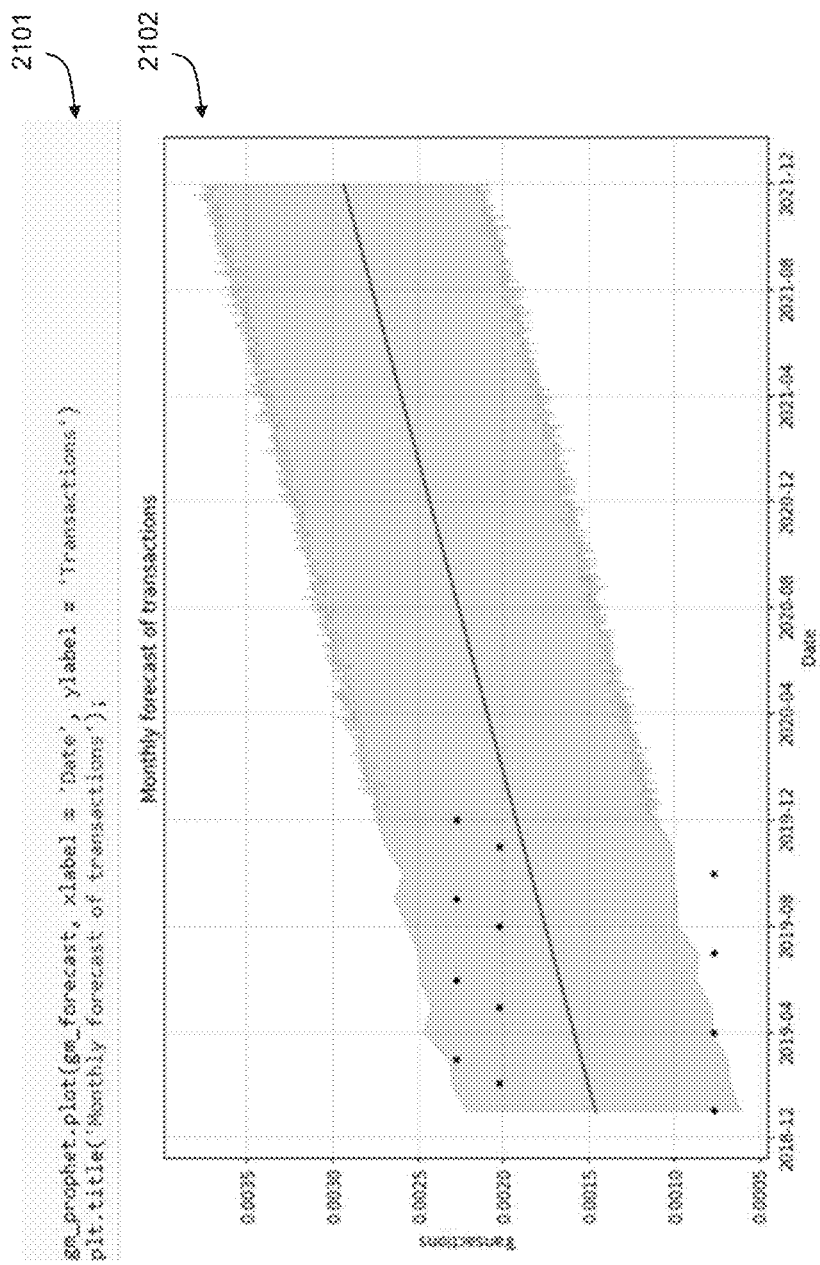
FIG. 21A depicts example pseudocode for plotting predicted transaction load over a given time period in an illustrative embodiment.
FIG. 21B depicts a plot of predicted transaction load over the given time period in an illustrative embodiment.

FIG. 20 depicts example pseudocode 2000 for predicting transaction load over a given time period. FIG. 21A depicts example pseudocode 2101 for plotting predicted transaction load over a given time period, and FIG. 21B depicts a plot 2102 of predicted transaction load over the given time period. The dots in the plot 2102 represent actual values, the line between the dots indicates the forecasted values, and the shaded region represents a region of uncertainty. The region of uncertainty increases the further out in the future the prediction is made because initial uncertainty propagates and grows over time. The plot 2102 is another example of a visualization 352-4 of prediction data 351-4.

Figure 9:
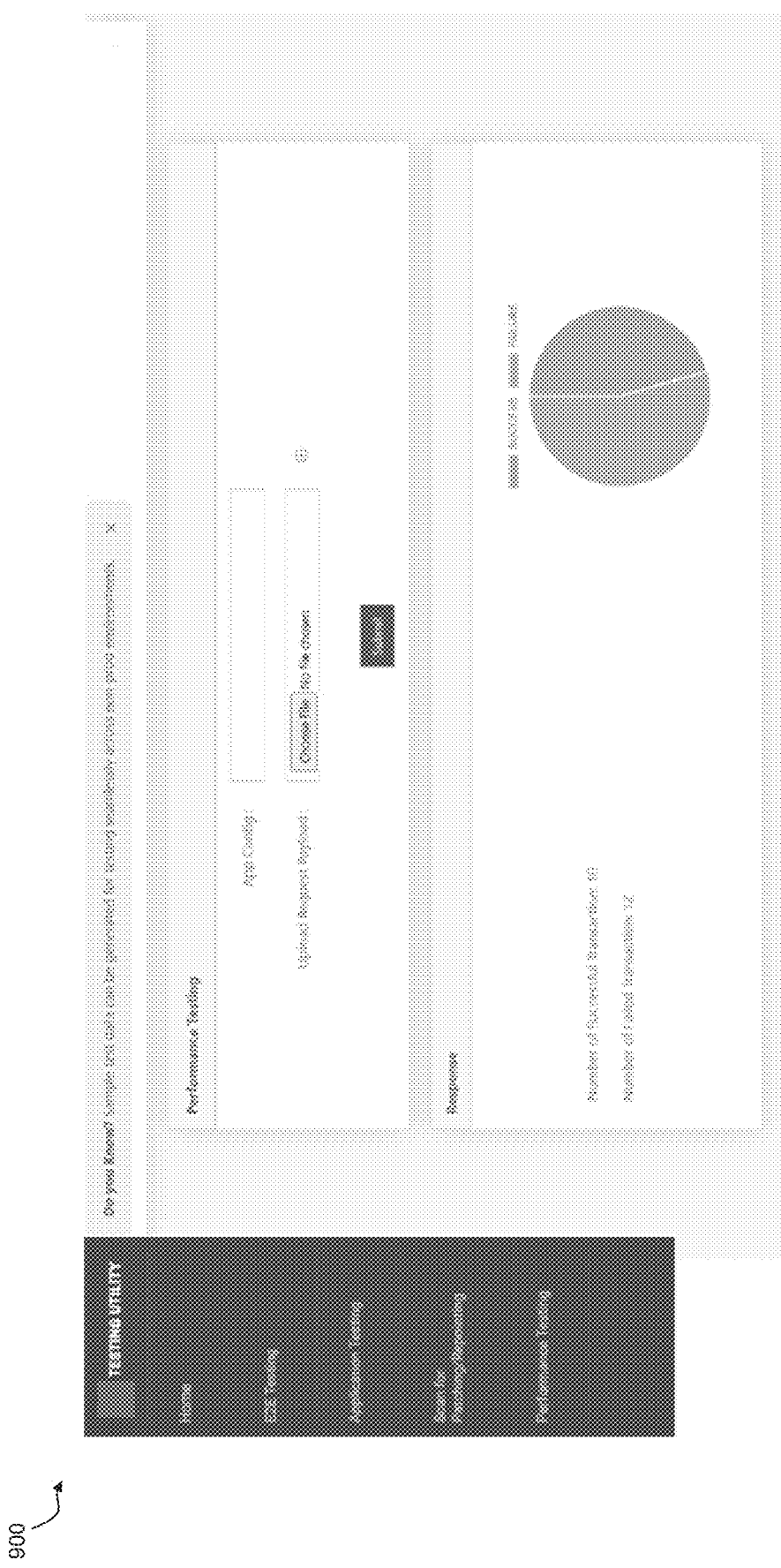
FIG. 9 illustrates a user interface for performance testing in an illustrative embodiment.

FIG. 9 illustrates a user interface 900 for performance testing in an illustrative embodiment. More specifically, the user interface 900 (e.g., GUI) assists with predicting load of each component using time series techniques to forecast component load and transactions. For example, based on an inputted application configuration or uploaded request payload file, the user interface 900 displays predicted successful and failed transactions associated with a given component.

Figure 4:
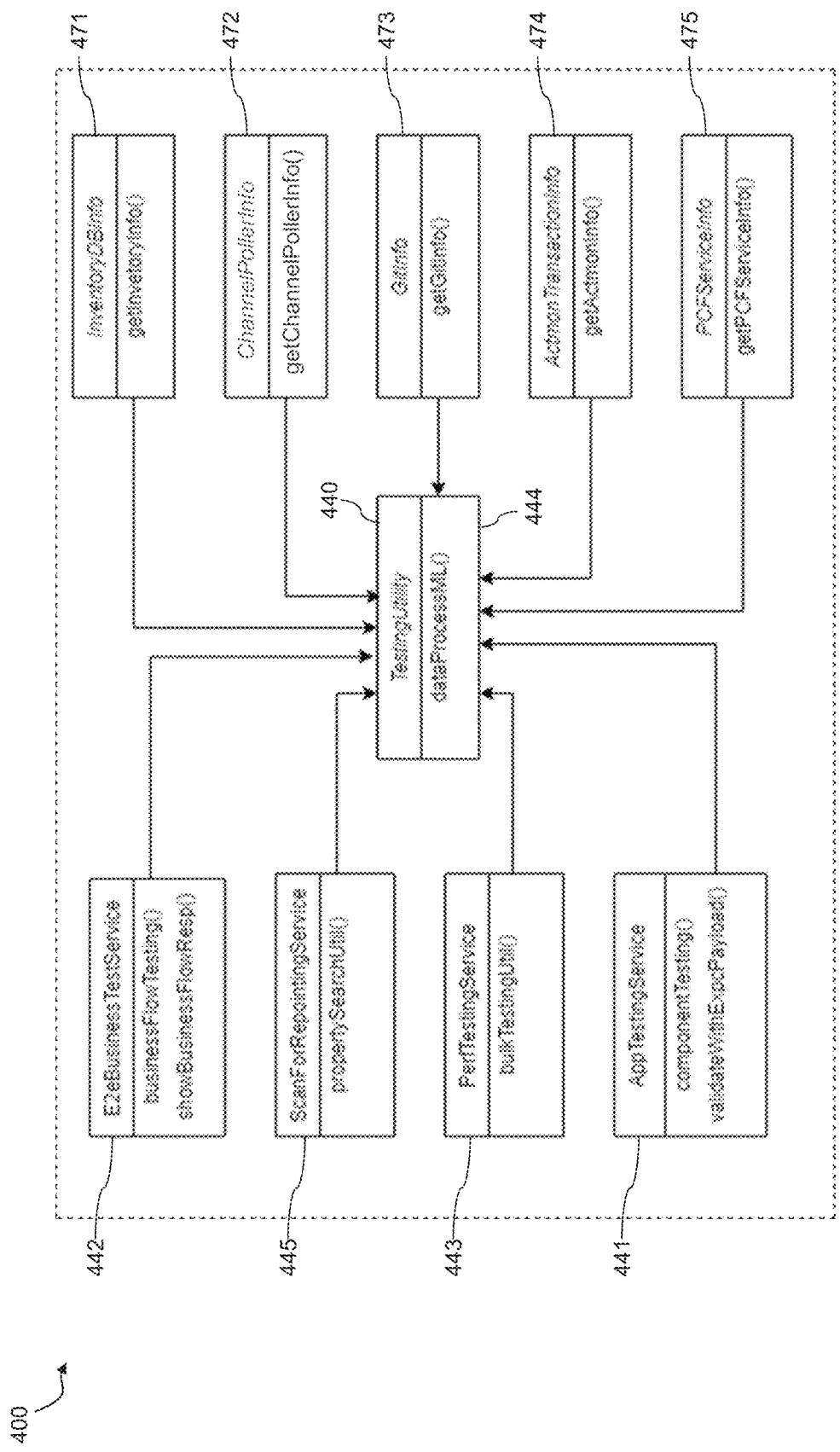
FIG. 4 depicts a class diagram for a testing framework in an illustrative embodiment.

FIG. 4 depicts a class diagram 400 of the testing framework 110, which enables E2E testing at any component level. The class diagram 400 provides additional details for the data sources 103 and the testing and prediction engine 140 comprising the component testing layer 141, flow testing layer 142, transaction prediction layer 143, machine learning layer 144 and update determination layer 145 of FIG. 1. For example, the application testing service (AppTestingService) 441, which corresponds to the component testing layer 141, performs component testing and validation with an expected payload. The E2E business testing service (E2EBusinessTestService) 442, which corresponds to the flow testing layer 142, performs business flow testing and depicts business flow. The performance testing service (PerfTestingService) 443, which corresponds to the transaction prediction layer 143, performs testing for bulk transactions of components. The scanning for re-pointing service (ScanForRepointingService) 445, which corresponds to the update determination layer 145, scans and tests components to determine a need for patching, re-pointing or other updates.

The inventory database information (InventoryDBInfo) and its associated getInventoryInfo block 471 correspond to the inventory database(s) 271 and to the retrieval of inventoried data and metadata associated with one or more components of the ecosystems 160. The channel poller information (ChannelPollerInfo) and its associated getChannelPollerInfo block 472 correspond to the channel poller data source 272 and the retrieval of channel polling data. The Git information (GitInfo) and its associated getGitInfo block 473 correspond to the change tracking service data 273 and the retrieval of, for example, Git properties and Git pipeline data. The Actmon transaction information (ActmonTransactionInfo) and its associated getActmonInfo block 474 correspond to the data monitoring service databases(s) 274 and the retrieval of data monitoring service data. The PCF service information (PCFServiceInfo) and its associated getPCFServiceInfo block 475 correspond to the application support service data 275, and the retrieval of cloud service (e.g., PCF) information. The testing utility (TestingUtility) block 440 and the data process machine learning (dataProcessML) block 444 correspond to the testing and prediction engine 140 and the machine learning layer 144.

As noted herein in connection with FIGS. 10-15, the testing framework 110 permits testing of components corresponding to various integration patterns. The framework 110 tests configurable parameters as well as source and target deliverables associated with one or more of the MOM MIPs to ensure messages are delivered as designed. In addition, the framework 110 simulates unavailable services which may be required for E2E testing such as, for example, when source or target components are not available or otherwise not operational.

Figure 18:
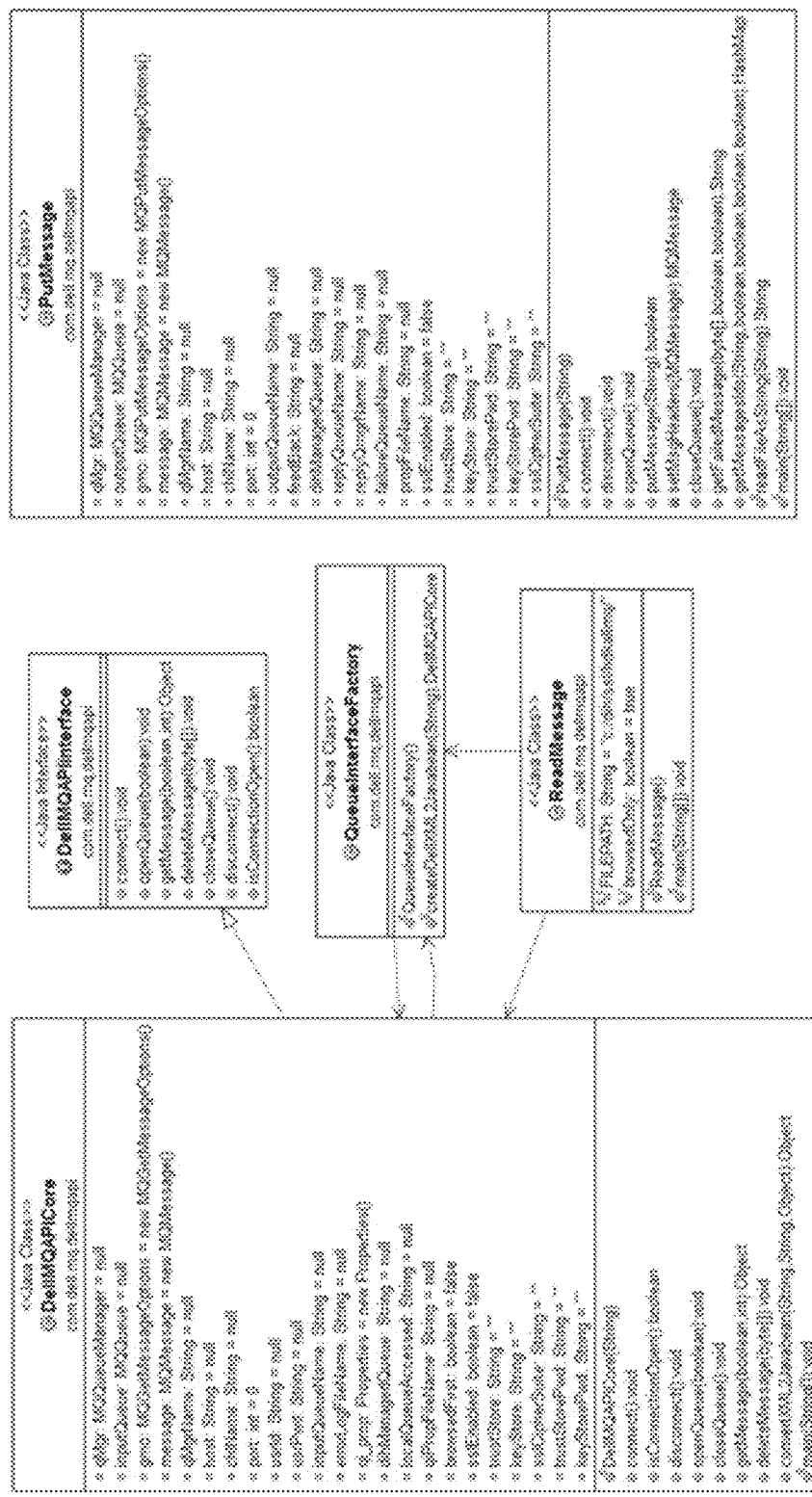
FIG. 18 depicts a class diagram for accessing and managing message queue objects in an illustrative embodiment.

FIG. 16 depicts example pseudocode 1600 for gathering message queue, manager and channel status information, and FIG. 17 depicts example pseudocode 1700 for operation of a message queuing API. FIG. 18 depicts a class diagram 1800 of methods for accessing and managing message queue objects in an illustrative embodiment.

According to an embodiment, the testing framework 110 is compatible with the vendor specific software, commands, formats and data of different MOM platforms to which it is connected. The data collection engine 120 retrieves vendor specific data from MOM servers to which the testing framework 110 is connected. The vendor specific data is in a native command format of the corresponding MOM server from which the vendor specific data is retrieved. The data collection engine 120 retrieves data in the native command format of each MOM server.

In one or more embodiments, the retrieved vendor specific data is inputted to a shared NAS mount where the vendor specific data from each of the MOM servers is saved. According to embodiments, the vendor specific data includes statistical data captured from each of the MOM servers. The statistical data comprises, but is not necessarily limited to, messaging queue names, messaging queue statuses (e.g., online, offline, idle, active), messaging queue locations (e.g., Internet Protocol (IP) addresses, ports), messaging queue types, messaging queue depths, timestamps for messages entering and leaving message queues, transmission times of messages from messaging queues, connections between messaging queues and of messaging queues to message producers and message consumers, total number of messages, and/or message transmission rates. One or more back-end databases (e.g., database 130) receive the vendor specific statistical data captured from the MOM servers from the shared NAS mount. According to one or more embodiments, the one or more back-end databases are regularly updated with the vendor specific data. For example, updates may occur over relatively short time periods (e.g., every second). The testing framework 110 may include an update/insert processing layer to insert/input the vendor specific data to the one or more back-end databases.

The vendor specific data is transmitted to a syncing engine, which includes a data converter to convert the vendor specific statistical data into commonly formatted data including generic MOM terminology. The vendor specific data may be pushed to the syncing engine from the back-end database or pulled from the back-end database. According to one or more embodiments, the commonly formatted data is in JSON format. According to embodiments, the data converter translates the unique terminology of MOM vendors into terminology that can be understood by users viewing a user interface on a user device 102. Users via, for example, user interfaces displayed on user devices 102, can initiate retrieval of the commonly formatted data through one or more APIs, and the commonly formatted data can be translated into a transaction view with statistical details of the data.

According to one or more embodiments, the visualizations generated by the visualization layers 152 comprise transaction views. The testing framework 110 tracks and traces application transactions flowing through different technology layers of an enterprise with multiple views of the transactions. For example, the testing framework 110 provides views of cascading transactions, where dependency can have multiple levels, and concurrently tracks and traces the transactions in sequential and parallel flows.

In illustrative embodiments, the visualizations generated by the visualization layers 152 also depict metrics associated with the testing, such as, for example, metrics of amounts of data flowing in and out of components that have been tested, the number of components that have been tested and testing progress. Metrics visualizations generated by the testing framework 110 provide full stack visibility of the types of data being inputted to and output from applications in an ecosystem.

According to one or more embodiments, the database 130 and other databases referred to herein can be configured according to a relational database management system (RDBMS) (e.g., PostgreSQL). In some embodiments, the database 130 and other databases referred to herein are implemented using one or more storage systems or devices associated with the testing framework 110. In some embodiments, one or more of the storage systems utilized to implement the database 130 and other databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the testing framework 110, the data collection engine 120, database 130, testing and prediction engine 140 and/or visualization engine 150 in other embodiments can be implemented at least in part externally to the testing framework 110, for example, as stand-alone servers, sets of servers or other types of systems coupled to the network 104. For example, the data collection engine 120, database 130, testing and prediction engine 140 and/or visualization engine 150 may be provided as cloud services accessible by the testing framework 110.

The data collection engine 120, database 130, testing and prediction engine 140 and/or visualization engine 150 in the FIG. 1 embodiment are each assumed to be implemented using at least one processing device. Each such processing device generally comprises at least one processor and an associated memory, and implements one or more functional modules for controlling certain features of the data collection engine 120, database 130, testing and prediction engine 140 and/or visualization engine 150.

At least portions of the testing framework 110 and the elements thereof may be implemented at least in part in the form of software that is stored in memory and executed by a processor. The testing framework 110 and the elements thereof comprise further hardware and software required for running the testing framework 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection engine 120, database 130, testing and prediction engine 140, visualization engine 150 and other elements of the testing framework 110 in the present embodiment are shown as part of the testing framework 110, at least a portion of the data collection engine 120, database 130, testing and prediction engine 140, visualization engine 150 and other elements of the testing framework 110 in other embodiments may be implemented on one or more other processing platforms that are accessible to the testing framework 110 over one or more networks. Such elements can each be implemented at least in part within another system element or at least in part utilizing one or more stand-alone elements coupled to the network 104.

It is assumed that the testing framework 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection engine 120, database 130, testing and prediction engine 140, visualization engine 150 and other elements of the testing framework 110, and the elements thereof can each be implemented in the form of one or more LXCs running on one or more VMs. Other arrangements of one or more processing devices of a processing platform can be used to implement the data collection engine 120, database 130, testing and prediction engine 140 and visualization engine 150, as well as other elements of the testing framework 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the testing framework 110 to reside in different data centers. Numerous other distributed implementations of the testing framework 110 are possible.

Accordingly, one or each of the data collection engine 120, database 130, testing and prediction engine 140, visualization engine 150 and other elements of the testing framework 110 can each be implemented in a distributed manner so as to comprise a plurality of distributed elements implemented on respective ones of a plurality of compute nodes of the testing framework 110.

It is to be appreciated that these and other features of illustrative embodiments are presented by way of example only, and should not be construed as limiting in any way. Accordingly, different numbers, types and arrangements of system elements such as the data collection engine 120, database 130, testing and prediction engine 140, visualization engine 150 and other elements of the testing framework 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the testing framework can be offered to cloud infrastructure customers or other users as part of FaaS, CaaS and/or PaaS offerings.

Figure 22:
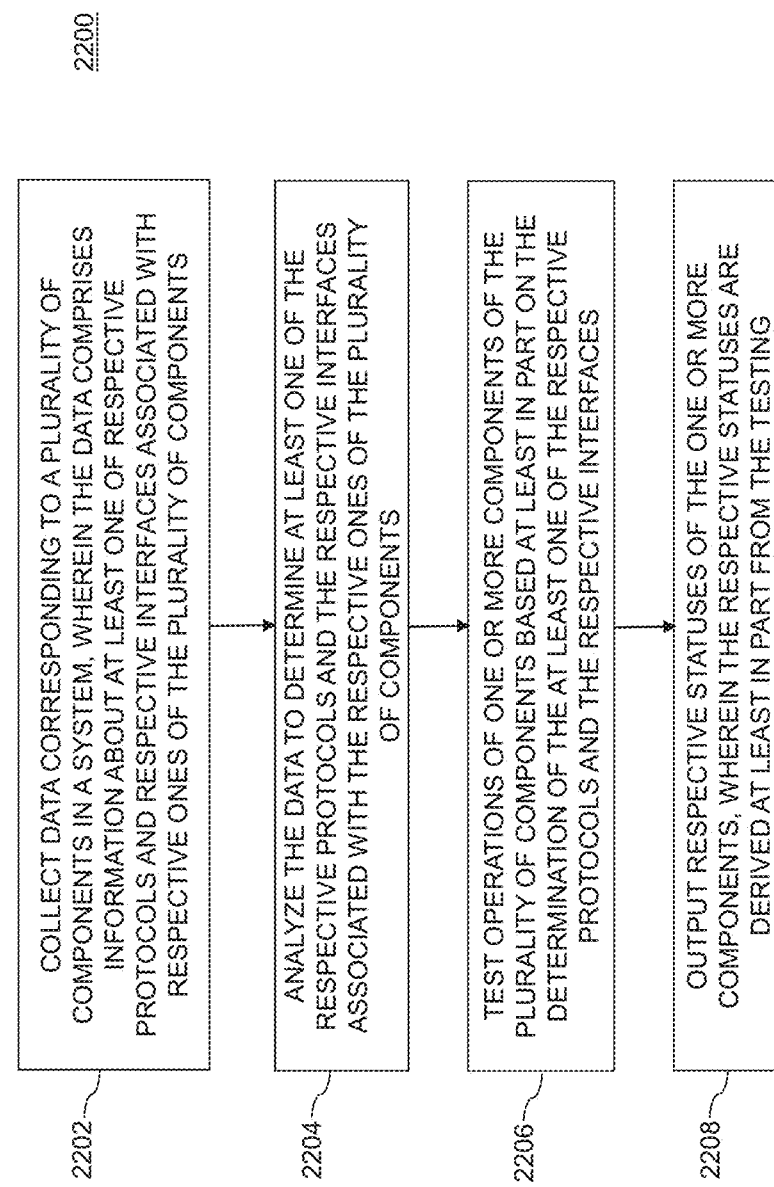
FIG. 22 depicts a process for testing ecosystem components according to an illustrative embodiment.

The operation of the information processing system 100 will now be described in further detail with reference to the flow diagram of FIG. 22. With reference to FIG. 22, a process 2200 for testing as shown includes steps 2202 through 2208, and is suitable for use in the system 100 but is more generally applicable to other types of information processing systems comprising a testing framework configured for testing ecosystem components.

In step 2202, data corresponding to a plurality of components in a system is collected. The data comprises information about at least one of respective protocols and respective interfaces associated with respective ones of the plurality of components. The plurality of components comprise one or more applications, one or more instances of middleware and/or one or more servers. The one or more instances of middleware comprise one or more MOM platforms.

In step 2204, the data is analyzed to determine at least one of the respective protocols and the respective interfaces associated with the respective ones of the plurality of components.

In step 2206, operations of one or more components of the plurality of components are tested based at least in part on the determination of the at least one of the respective protocols and the respective interfaces.

In step 2208, respective statuses of the one or more components are outputted, wherein the respective statuses are derived at least in part from the testing. One or more visualizations depicting one or more of the respective statuses are generated. The one or more the respective statuses comprise a successful transaction and/or a failed transaction corresponding to one or more applications.

In an embodiment, the respective protocols comprise one or more MOM MIPs. The one or more MOM MIPs comprise at least one of a P2P without routing MOM MIP, a P2P without routing and with load balancing MOM MIP, a many-to-one P2P without routing MOM MIP, a P2P with routing MOM MIP, a fan-out MOM MIP and a publisher/subscriber MOM MIP. The testing of the one or more components comprises testing at least one of a source component and a target component associated with one or more of the MOM MIPs. In an embodiment, the respective protocols may further comprise at least one of a webservice protocol, a batch protocol, a request/reply protocol, an XML protocol, a JSON protocol, a REST protocol and a SOAP.

The process may further comprise identifying at least one component of the one or more components requiring an update based at least in part on one or more of the respective statuses, and identifying at least one of a protocol and an interface corresponding to the at least one component requiring the update. The identifying of the at least one component requiring the update comprises determining, based at least in part on the testing, that operation of the at least one component is impeded by a modification to an API.

In one or more embodiments, the testing comprises load testing of the one or more components, and the method further comprises predicting a transaction load for the one or more components at one or more time periods, and scheduling the load testing based at least in part on the predicted transaction load. The predicting is performed using one or more machine learning techniques. One or more unavailable services required for performance of the testing may be simulated.

It is to be appreciated that the FIG. 22 process and other features and functionality described above can be adapted for use with other types of information systems configured to execute testing services in a testing framework or other type of platform.

The particular processing operations and other system functionality described in conjunction with the flow diagram of FIG. 22 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 22 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a testing framework as disclosed herein can provide a number of significant advantages relative to conventional arrangements. For example, the testing framework handles multiple integration patterns and protocols used in large enterprises, thereby eliminating the need for using multiple testing frameworks from different enterprises for various patterns. As an additional advantage, the embodiments provide configuration verification and dynamic updating of integration points without redeploying a codebase of the testing framework.

Further, the embodiments advantageously provide an innovative approach to estimating and predicting possible transaction loads of components by using time series forecasting algorithms, which facilitates capacity planning for load testing.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the testing framework 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a testing framework in illustrative embodiments. These and other cloud-based systems in illustrative embodiments can include object stores.

Illustrative embodiments of processing platforms will now be described in greater detail with reference to FIGS. 23 and 24. Although described in the context of system 100, these platforms may also be used to implement at least portions of other information processing systems in other embodiments.

Figure 23:
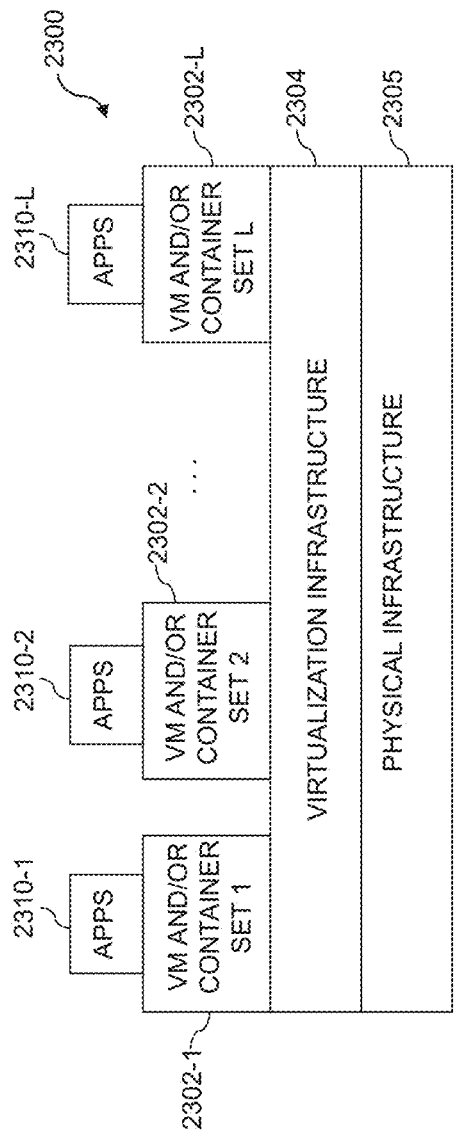
FIGS. 23 and 24 show examples of processing platforms that may be utilized to implement at least a portion of an information processing system according to illustrative embodiments.
Figure 24:
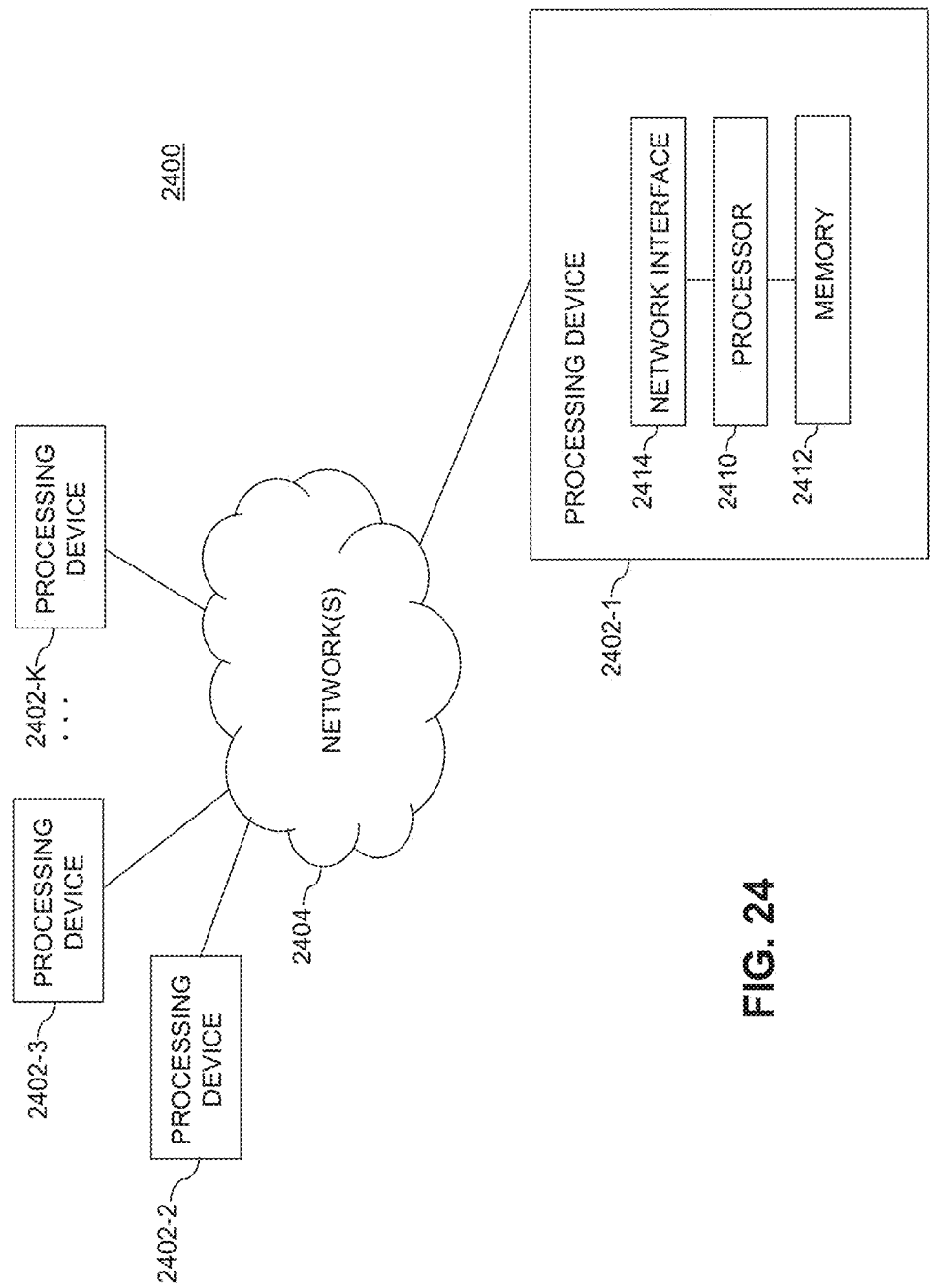

FIG. 23 shows an example processing platform comprising cloud infrastructure 2300. The cloud infrastructure 2300 comprises a combination of physical and virtual processing resources that may be utilized to implement at least a portion of the information processing system 100. The cloud infrastructure 2300 comprises multiple virtual machines (VMs) and/or container sets 2302-1, 2302-2, . . . 2302-L implemented using virtualization infrastructure 2304. The virtualization infrastructure 2304 runs on physical infrastructure 2305, and illustratively comprises one or more hypervisors and/or operating system level virtualization infrastructure. The operating system level virtualization infrastructure illustratively comprises kernel control groups of a Linux operating system or other type of operating system.

The cloud infrastructure 2300 further comprises sets of applications 2310-1, 2310-2, . . . 2310-L running on respective ones of the VMs/container sets 2302-1, 2302-2, . . . 2302-L under the control of the virtualization infrastructure 2304. The VMs/container sets 2302 may comprise respective VMs, respective sets of one or more containers, or respective sets of one or more containers running in VMs.

In some implementations of the FIG. 23 embodiment, the VMs/container sets 2302 comprise respective VMs implemented using virtualization infrastructure 2304 that comprises at least one hypervisor. A hypervisor platform may be used to implement a hypervisor within the virtualization infrastructure 2304, where the hypervisor platform has an associated virtual infrastructure management system. The underlying physical machines may comprise one or more distributed processing platforms that include one or more storage systems.

In other implementations of the FIG. 23 embodiment, the VMs/container sets 2302 comprise respective containers implemented using virtualization infrastructure 2304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 2300 shown in FIG. 23 may represent at least a portion of one processing platform. Another example of such a processing platform is processing platform 2400 shown in FIG. 24.

The processing platform 2400 in this embodiment comprises a portion of system 100 and includes a plurality of processing devices, denoted 2402-1, 2402-2, 2402-3, . . . 2402-K, which communicate with one another over a network 2404.

The network 2404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 2402-1 in the processing platform 2400 comprises a processor 2410 coupled to a memory 2412. The processor 2410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 2412 may comprise random access memory (RAM), read-only memory (ROM), flash memory or other types of memory, in any combination. The memory 2412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2402-1 is network interface circuitry 2414, which is used to interface the processing device with the network 2404 and other system components, and may comprise conventional transceivers.

The other processing devices 2402 of the processing platform 2400 are assumed to be configured in a manner similar to that shown for processing device 2402-1 in the figure.

Again, the particular processing platform 2400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the testing framework 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and testing frameworks. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    collecting data corresponding to a plurality of computer-based components in a system, wherein the data comprises information about at least one of respective protocols and respective interfaces associated with respective ones of the plurality of computer-based components;
    analyzing the data to determine at least one of the respective protocols and the respective interfaces associated with the respective ones of the plurality of computer-based components;
    determining one or more testing methods compatible with the respective ones of the plurality of computer-based components based at least in part on the determination of the at least one of the respective protocols and the respective interfaces;
    testing operations of one or more computer-based components of the plurality of computer-based components using the one or more testing methods; and
    outputting respective statuses of the one or more computer-based components;
    wherein the respective statuses are derived at least in part from the testing; and
    wherein the steps of the method are executed by a processing device operatively coupled to a memory.

2. The method of claim 1, wherein the plurality of computer-based components comprise at least one of one or more applications, one or more instances of middleware and one or more servers.

3. The method of claim 2, wherein the one or more instances of middleware comprise one or more message-oriented-middleware platforms.

4. The method of claim 1, further comprising:
generating one or more visualizations depicting one or more of the respective statuses, wherein the one or more the respective statuses comprise at least one of a successful transaction and a failed transaction corresponding to one or more applications.

5. The method of claim 1, wherein the respective protocols comprise one or more message-oriented-middleware messaging integration patterns.

6. The method of claim 5, wherein the one or more message-oriented-middleware messaging integration patterns comprise at least one of a point-to-point without routing message-oriented-middleware messaging integration pattern, a point-to-point without routing and with load balancing message-oriented-middleware messaging integration pattern, a many-to-one point-to-point without routing message-oriented-middleware messaging integration pattern, a point-to-point with routing message-oriented-middleware messaging integration pattern, a fan-out message-oriented-middleware messaging integration pattern and a publisher/subscriber message-oriented-middleware messaging integration pattern.

7. The method of claim 5, wherein the testing of the one or more computer-based components comprises testing at least one of a source computer-based component and a target computer-based component associated with one or more of the message-oriented-middleware messaging integration patterns.

8. The method of claim 1, wherein the respective protocols comprise at least one of a webservice protocol, a batch protocol, a request/reply protocol, an extensible markup language protocol, a JavaScript object notation protocol, a representational state transfer protocol and a simple object access protocol.

9. The method of claim 1, further comprising identifying at least one computer-based component of the one or more computer-based components requiring an update based at least in part on one or more of the respective statuses.

10. The method of claim 9, further comprising identifying at least one of a protocol and an interface corresponding to the at least one computer-based component requiring the update.

11. The method of claim 9, wherein the identifying of the at least one computer-based component requiring the update comprises determining, based at least in part on the testing, that operation of the at least one computer-based component is impeded by a modification to an application programming interface.

12. The method of claim 1, wherein the testing comprises load testing of the one or more computer-based components, and the method further comprises:
predicting a transaction load for the one or more computer-based components at one or more time periods; and
scheduling the load testing based at least in part on the predicted transaction load;
wherein the predicting is performed using one or more machine learning techniques.

13. The method of claim 1, further comprising simulating one or more unavailable services required for performance of the testing.

14. The method of claim 1, wherein the data further comprises information about respective channels associated with respective ones of the plurality of computer-based components, wherein the analyzing further comprises analyzing at least two or more of the respective protocols, the respective channels and the respective interfaces associated with the respective ones of the plurality of computer-based components, wherein at least one of the plurality of computer-based components has at least one of a different respective protocol, a different respective channel, and a different respective interface from other ones of the plurality of computer-based components.

15. An apparatus comprising:
a processing device operatively coupled to a memory and configured to:
collect data corresponding to a plurality of computer-based components in a system, wherein the data comprises information about at least one of respective protocols and respective interfaces associated with respective ones of the plurality of computer-based components;
analyze the data to determine at least one of the respective protocols and the respective interfaces associated with the respective ones of the plurality of computer-based components;
determine one or more testing methods compatible with the respective ones of the plurality of computer-based components based at least in part on the determination of the at least one of the respective protocols and the respective interfaces;
test operations of one or more computer-based components of the plurality of computer-based components using the one or more testing methods; and
output respective statuses of the one or more computer-based components, wherein the respective statuses are derived at least in part from the testing.

16. The apparatus of claim 15, further comprising identifying at least one computer-based component of the one or more computer-based components requiring an update based at least in part on one or more of the respective statuses, wherein the processing device is further configured to identify at least one of a protocol and an interface corresponding to the at least one computer-based component requiring the update.

17. The apparatus of claim 15, wherein the testing comprises load testing of the one or more computer-based components, and the processing device is further configured to:
predict a transaction load for the one or more computer-based components at one or more time periods; and
schedule the load testing based at least in part on the predicted transaction load;
wherein the predicting is performed using one or more machine learning techniques.

18. An article of manufacture comprising a non-transitory processor-readable storage medium having stored therein program code of one or more software programs, wherein the program code when executed by at least one processing device causes said at least one processing device to perform the steps of:
collecting data corresponding to a plurality of computer-based components in a system, wherein the data comprises information about at least one of respective protocols and respective interfaces associated with respective ones of the plurality of computer-based components;
analyzing the data to determine at least one of the respective protocols and the respective interfaces associated with the respective ones of the plurality of computer-based components;
determining one or more testing methods compatible with the respective ones of the plurality of computer-based components based at least in part on the determination of the at least one of the respective protocols and the respective interfaces;

testing operations of one or more computer-based components of the plurality of computer-based components using the one or more testing methods; and outputting respective statuses of the one or more computer-based components, wherein the respective statuses are derived at least in part from the testing.

19. The article of manufacture of claim 18, further comprising identifying at least one computer-based component of the one or more computer-based components requiring an update based at least in part on one or more of the respective statuses, wherein the program code causes said at least one processing device to further perform the step of identifying at least one of a protocol and an interface corresponding to the at least one computer-based component requiring the update.

20. The article of manufacture of claim 18, wherein the testing comprises load testing of the one or more computer-based components, and the program code causes said at least one processing device to further perform the steps of:

predicting a transaction load for the one or more computer-based components at one or more time periods; and scheduling the load testing based at least in part on the predicted transaction load;

wherein the predicting is performed using one or more machine learning techniques.

\* \* \* \* \*